(12) United States Patent
Nakajima et al.

(10) Patent No.: US 11,493,657 B2
(45) Date of Patent: Nov. 8, 2022

(54) ULTRASONIC TRANSDUCERS FOR MEASURING FORMATION VELOCITIES

(71) Applicant: Schlumberger Technology Corporation, Sugar Land, TX (US)

(72) Inventors: Hiroshi Nakajima, Sugar Land, TX (US); Tatsuaki Kamoi, Kanagawa-ken (JP); Hiroshi Hori, Clamart (FR); Evgeniya Deger, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 81 days.

(21) Appl. No.: 16/967,147

(22) PCT Filed: Feb. 8, 2019

(86) PCT No.: PCT/US2019/017146
§ 371 (c)(1),
(2) Date: Aug. 4, 2020

(87) PCT Pub. No.: WO2019/157243
PCT Pub. Date: Aug. 15, 2019

(65) Prior Publication Data
US 2020/0363550 A1    Nov. 19, 2020

Related U.S. Application Data

(60) Provisional application No. 62/627,788, filed on Feb. 8, 2018.

(51) Int. Cl.
*G01V 1/46* (2006.01)
*G01H 11/08* (2006.01)
*G01V 1/52* (2006.01)

(52) U.S. Cl.
CPC ............ *G01V 1/46* (2013.01); *G01H 11/08* (2013.01); *G01V 1/52* (2013.01); *G01V 2200/16* (2013.01)

(58) Field of Classification Search
CPC combination set(s) only.
See application file for complete search history.

(56) References Cited

U.S. PATENT DOCUMENTS 2,769,867 A * 11/1956 Crownover ............ H04R 17/00
                                                            381/163
3,437,834 A    4/1969 Schwartz
(Continued)

FOREIGN PATENT DOCUMENTS

CA    2581535 A1    4/2006
EP    1806473 A1    7/2007
(Continued)

OTHER PUBLICATIONS

Office Action issued in U.S. Appl. No. 16/412,140 dated Sep. 24, 2021, 18 pages.
(Continued)

*Primary Examiner* — Isam A Alsomiri
*Assistant Examiner* — Amie M Ndure
(74) *Attorney, Agent, or Firm* — Jeffrey D. Frantz

(57) ABSTRACT

Example ultrasonic transducers for measuring formation velocities are disclosed herein. An example apparatus includes a housing and an acoustic transducer having a first surface and a second surface opposite the first surface. The acoustic transducer is at least partially disposed in the housing. The example apparatus includes a window supported by the housing. At least a portion of the first surface of the acoustic transducer is in contact with the window. The housing and the window are to form a fluid seal for the acoustic transducer.

20 Claims, 12 Drawing Sheets

(56) References Cited

U.S. PATENT DOCUMENTS

| | | | |
|---|---|---|---|
| 3,502,169 A | | 3/1970 | Chapman |
| 3,524,162 A | | 8/1970 | Zill |
| 4,255,798 A | | 3/1981 | Havira |
| 4,594,691 A | | 6/1986 | Kimball et al. |
| 4,594,692 A | | 6/1986 | Read et al. |
| 4,757,479 A | | 7/1988 | Masson et al. |
| 5,299,578 A | * | 4/1994 | Rotteveel .................. A61B 8/12 600/444 |
| 5,354,956 A | | 10/1994 | Orban et al. |
| 5,398,215 A | | 3/1995 | Sinha et al. |
| 5,511,037 A | | 4/1996 | Randall et al. |
| 5,581,024 A | | 12/1996 | Meyer, Jr. et al. |
| 5,747,672 A | | 5/1998 | Parent et al. |
| 5,753,812 A | | 5/1998 | Aron et al. |
| 6,205,087 B1 | | 3/2001 | Fukuhara et al. |
| 6,466,513 B1 | * | 10/2002 | Pabon .................. E21B 47/085 367/35 |
| 6,510,389 B1 | | 1/2003 | Winkler et al. |
| 6,678,616 B1 | | 1/2004 | Winkler et al. |
| 7,399,284 B2 | * | 7/2008 | Miwa ....................... A61N 7/00 601/2 |
| 7,460,435 B2 | | 12/2008 | Garcia-Osuna et al. |
| 7,675,813 B2 | | 3/2010 | Valero et al. |
| 7,694,570 B1 | | 4/2010 | Dam et al. |
| 7,913,806 B2 | | 3/2011 | Pabon et al. |
| 9,027,670 B2 | | 5/2015 | Sugiura |
| 9,625,599 B2 | | 4/2017 | Prioul et al. |
| 10,012,763 B2 | | 7/2018 | Perkins et al. |
| 2003/0067249 A1 | * | 4/2003 | Lockwood .............. B06B 1/0622 310/324 |
| 2003/0073906 A1 | * | 4/2003 | Flesch .................. A61B 8/4494 600/459 |
| 2003/0130657 A1 | * | 7/2003 | Tom .................... A61B 18/1477 606/47 |
| 2004/0048470 A1 | * | 3/2004 | Dinet .................... B06B 1/0629 438/689 |
| 2005/0152219 A1 | | 7/2005 | Garcia-Osuna et al. |
| 2007/0124000 A1 | | 5/2007 | Moughler et al. |
| 2008/0037808 A1 | * | 2/2008 | Sawada ................ B06B 1/0622 381/190 |
| 2008/0186805 A1 | | 8/2008 | Han |
| 2008/0228231 A1 | * | 9/2008 | Raphael ............. A61B 17/7032 606/301 |
| 2009/0183941 A1 | | 7/2009 | Pabon et al. |
| 2012/0029393 A1 | * | 2/2012 | Lee ....................... A61B 8/4444 601/2 |
| 2013/0060140 A1 | * | 3/2013 | Sinelnikov ........... A61B 8/4494 600/439 |
| 2013/0341091 A1 | | 12/2013 | Sugiura |
| 2014/0013850 A1 | * | 1/2014 | Kim .................... G01N 29/2406 73/640 |
| 2015/0211352 A1 | | 7/2015 | Sugiura |
| 2017/0199295 A1 | | 7/2017 | Mandal |
| 2017/0293044 A1 | | 10/2017 | Gilstrap et al. |
| 2017/0314385 A1 | | 11/2017 | Hori et al. |
| 2019/0310173 A1 | | 10/2019 | Mayes |
| 2019/0345816 A1 | | 11/2019 | Auchere et al. |
| 2021/0055444 A1 | | 2/2021 | Hori et al. |

FOREIGN PATENT DOCUMENTS

| | | |
|---|---|---|
| JP | 3372572 B2 | 2/2003 |
| KR | 200442120 Y1 | 10/2008 |
| KR | 101547508 B1 | 8/2015 |
| WO | 2009061561 A1 | 5/2009 |
| WO | 2012027630 A2 | 3/2012 |

OTHER PUBLICATIONS

Office Action issued in U.S. Appl. No. 16/412,140 dated Apr. 28, 2021, 25 pages.

Dashevskiy, D. et al., "Dynamic Depth Correction to Reduce Depth Uncertainty and Improve MWD/LWD Log Quality", Mar. 2008 SPE Drilling & Completion, pp. 13-22.

Kimball, C. V. et al., Semblance Processing of Borehole Acoustic Array Data, Geophysics, 1984, 49(3), pp. 274-281.

International Search Report and Written Opinion issued in International Patent application PCT/US2019/017146 dated May 7, 2019, 13 pages.

International Search Report and Written Opinion issued in International Patent application PCT/US2019/017145 dated May 21, 2019, 11 pages.

Notice of Allowance issued in U.S. Appl. No. 16/412,140 dated Feb. 15, 2022, 14 pages.

B. Mandal and A. Quintero, "A new monocable circumferential acoustic scanner tool (Cast-M) for cased-hole and openhole applications", SPWLA 51st Annual Logging Symposium held in Perth, Western Australia, Jun. 19-23, 2010, 14 pages.

* cited by examiner

ULTRASONIC TRANSDUCERS FOR MEASURING FORMATION VELOCITIES

RELATED APPLICATION

This patent claims the benefit of U.S. Provisional Patent Application Ser. No. 62/627,788, which was filed on Feb. 8, 2018. U.S. Provisional Patent Application Ser. No. 62/627,788 is hereby incorporated herein by reference in its entirety. Priority to U.S. Provisional Patent Application Ser. No. 62/627,788 is hereby claimed.

BACKGROUND

This disclosure relates generally to ultrasonic transducers and, more specifically, to ultrasonic transducers for measuring formation velocities.

DESCRIPTION OF THE RELATED ART

The generation and recording of borehole acoustic waves is an important measurement employed in oilfield borehole logging. Many borehole tools and methods are currently available for taking acoustic measurements. Some tools include a single source of sonic waves and two or more receivers. Other tools include two or more acoustic sources and multiple receivers arranged in an array. Currently available acoustic tools are useful in providing a large range of information regarding the surrounding formation and the borehole parameters.

U.S. Pat. No. 6,678,616 describes methods and tools for producing formation velocity image data sets. U.S. Pat. No. 6,510,389 describes methods for acoustic detection of stress-induced mechanical damage in borehole walls. U.S. Pat. No. 7,913,806 describes enclosures for containing acoustic transducers and electronics on downhole tools. U.S. Pat. No. 6,466,513 describes ultrasonic sensor assemblies for measuring the diameter of a well as it is being drilled. U.S. Pat. No. 5,354,956 describes ultrasonic pulse echo apparatus and methods for measuring characteristics of a borehole while it is being drilled. U.S. Pat. No. 5,753,812 describes acoustic wave transducers for sonic logging while drilling. U.S. Pat. No. 7,460,435 describes acoustic transducers for tubulars.

U.S. Pat. No. 3,437,834 describes methods and apparatus for detecting the time of occurrence of a selected signal. U.S. Pat. No. 7,675,813 describes methods and apparatus for detecting first arrival data for component signals of interest, which may be used to estimate formation slowness. U.S. Pat. No. 4,594,691 describes sonic well logging methods and systems for determining slowness-time coherence. An article titled "Semblance Processing of Borehole Acoustic Array Data," authored by Christopher V. Kimball and Thomas L. Marzetta, published in GEOPHYSICS, 49(3), 1984, pp. 274-281, describes semblance processing of borehole acoustic array data.

Figure 1:
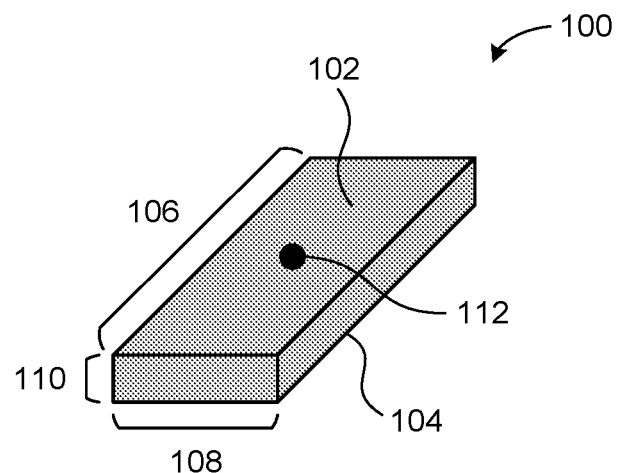
FIG. 1 is a perspective view of an example receiver that may be implemented in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

The ultrasonic transducers disclosed herein are structured, arranged, and/or configured to advantageously provide formation velocity measurements of an improved quality relative to the measurement capabilities of conventional ultrasonic transducers of the types described above. The disclosed ultrasonic transducers may be used for ultrasonic pitch-catch measurements, and/or for ultrasonic pulse-echo measurements. The disclosed ultrasonic transducers may be implemented in connection with logging while drilling (LWD) or wireline (WL) downhole tools. The disclosed ultrasonic transducers advantageously provide for low cost, easy to manufacture measurement apparatus having stable performance features that are highly reliable in the harsh conditions of downhole environments.

In some examples, the disclosed ultrasonic transducers include a receiver array having a plurality of receivers arranged, positioned, and/or spaced apart from one another along an array line. In some examples, the receivers of the receiver array may be equally spaced apart from one another along the array line. In some examples, respective ones of the receivers have a rectangular profile including a long axis and a short axis. In some examples, respective ones of the short axes of the receivers may be arranged and/or positioned along the array line. In some examples, the receiver array is structured and/or configured to record acoustic pressure waves propagating in well fluid, the acoustic pressure waves being excited as formation waves (e.g., refracted compressional and shear waves, P and S waves, pseudo-Rayleigh, trapped, leaky waves, etc.). In some examples, the disclosed ultrasonic transducers facilitate acoustic decoupling of a direct arrival between a transmitter and a receiver. In some examples, the disclosed ultrasonic transducers facilitate acoustic decoupling of a tool arrival through a drill collar or a housing.

FIG. 1 is a perspective view of an example receiver 100 that may be implemented in accordance with the teachings of this disclosure. The receiver 100 of FIG. 1 has an example front surface 102 and an example back surface 104 located opposite the front surface 102. The receiver 100 has an example length 106, an example width 108, and an example thickness 110. In the illustrated example of FIG. 1, the length 106 defines a long axis of the receiver 100, and the width 108 defines a short axis of the receiver 100. The respective dimensions of the length 106, width 108, and thickness 110 of the receiver 100 may be of any value.

In the illustrated example of FIG. 1, the front surface 102 and the back surface 104 of the receiver 100 have a generally rectangular shape. In other examples, the front surface 102 and/or the back surface 104 of the receiver 100 may have other cross-sectional shapes, including regular (e.g., triangular, trapezoidal, circular, elliptical, etc.) and irregular geometric shapes. In the illustrated example of FIG. 1, the receiver 100 has a rectangular prismatic shape. In other examples, the receiver 100 may have a different shape, including a regular (e.g., cubic, prismatic, cylindrical, conical, spherical, pyramidal, etc.) or an irregular geometric shape.

In some examples, the receiver 100 of FIG. 1 includes a first electrode positioned adjacent the front surface 102 of the receiver 100 and a second electrode positioned adjacent the back surface 104 of the receiver 100. In some such examples, the first electrode and the second electrode may respectively be located within the thickness 110 of the receiver 100 such that the first electrode and the second electrode are located between the front surface 102 and the back surface 104 of the receiver 100 (e.g., internally relative to the receiver 100 shown in FIG. 1). The receiver 100 may be operatively coupled to a controller via a first wire extending between the controller and the first electrode of the receiver 100 and a second wire extending between the controller and the second electrode of the receiver 100.

In some examples, the front surface 102 of the receiver 100 of FIG. 1 is a reception surface for receiving acoustic waves and/or signals propagated through a geological formation and refracted from the geological formation toward the front surface 102 of the receiver 100. The receiver 100 converts the received acoustic waves and/or signals into corresponding electrical signals. The corresponding electrical signals may be forwarded to a controller (e.g., a processor). The controller may implement one or more waveform processing algorithms or techniques to calculate and/or determine a formation velocity (e.g., a wave propagation velocity for the formation) based on the corresponding electrical signals measured by the receiver 100.

The receiver 100 of FIG. 1 also includes an example reference point 112 that is defined as the sensitivity center of the receiver 100. In some examples, the reference point 112 of the receiver 100 may be located at the geometrical center of the front surface 102 (e.g., the reception surface) of the receiver 100. In some examples, the reference point 112 may be located at the geometrical center of a first electrode or a second electrode of the receiver 100 (e.g., the first and second electrodes positioned as described above).

Figure 2:
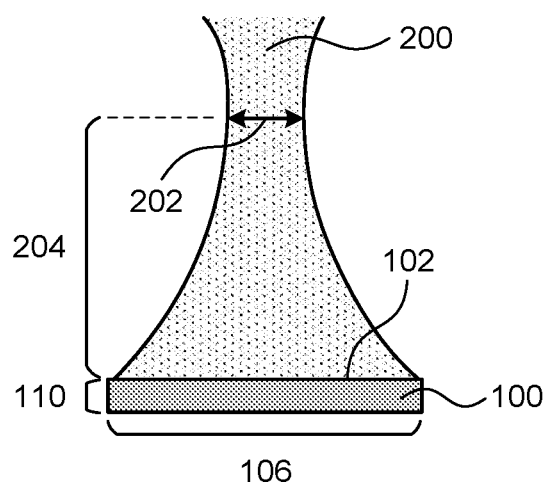
FIG. 2 is a first side view of the example receiver of FIG. 1 illustrating an example acoustic beam profile along the example length of the receiver.
Figure 3:
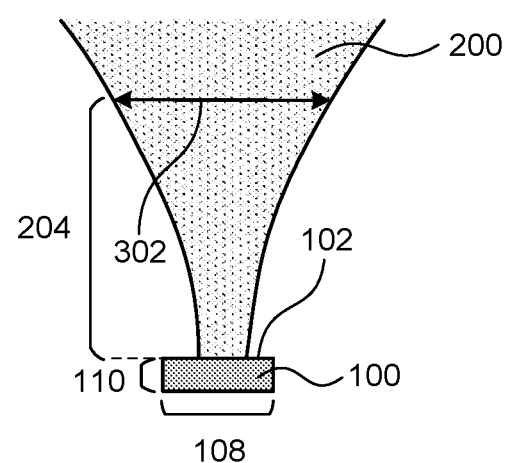
FIG. 3 is a second side view of the example receiver of FIGS. 1 and 2 illustrating the example acoustic beam profile of FIG. 2 along the example width of the receiver.

FIG. 2 is a first side view of the example receiver 100 of FIG. 1 illustrating an example acoustic beam profile 200 along the example length 106 (e.g., the long axis) of the receiver 100. FIG. 3 is a second side view of the example receiver 100 of FIGS. 1 and 2 illustrating the example acoustic beam profile 200 of FIG. 2 along the example width 108 (e.g., the short axis) of the receiver 100. As shown in FIG. 2, the acoustic beam profile 200 of the receiver 100 becomes narrower along the length 106 and/or long axis of the receiver 100 as the acoustic beam profile 200 extends away from the front surface 102 of the receiver 100. The acoustic beam profile 200 has an example first beam width 202 along the length 106 and/or long axis of the receiver 100 at an example distance 204 away from the front surface 102 of the receiver 100. As shown in FIG. 3, the acoustic beam profile 200 of the receiver 100 becomes wider along the width 108 and/or short axis of the receiver 100 as the acoustic beam profile 200 extends away from the front surface 102 of the receiver 100. The acoustic beam profile 200 has an example second beam width 302 along the width 108 and/or short axis of the receiver 100 at the distance 204 away from the front surface 102 of the receiver 100. In the illustrated example of FIGS. 2 and 3, the second beam width 302 of the acoustic beam profile 200 is greater than the first beam width 202 of the acoustic beam profile 200. The first beam width of 202 and the second beam width 302 of the receiver 100 respectively indicate the geometrical region from which acoustic signal receiving sensitivity of the receiver 100 at the example distance 204 is high or focused.

Figure 4:
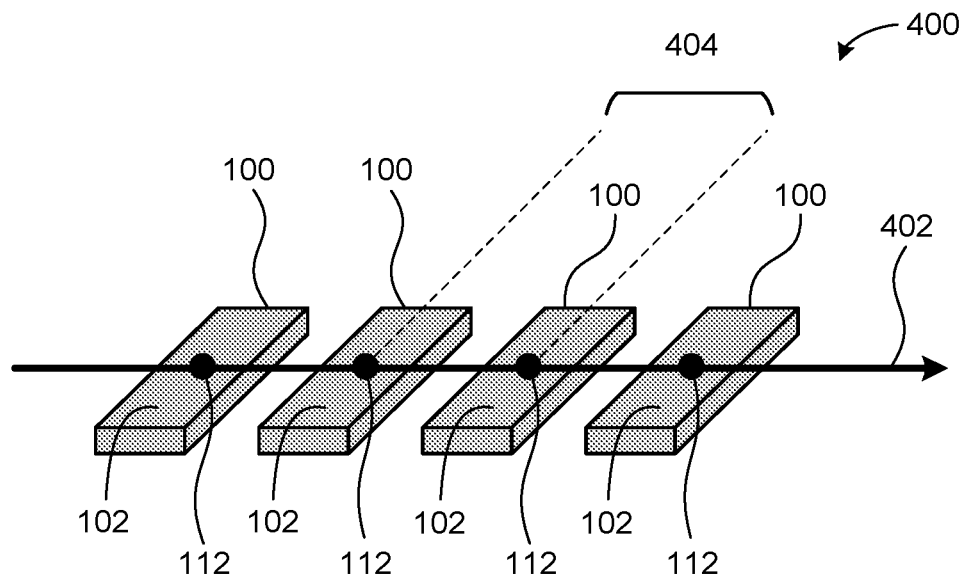
FIG. 4 is a perspective view of an example receiver array that may be implemented in accordance with the teachings of this disclosure.

FIG. 4 is a perspective view of an example receiver array 400 that may be implemented in accordance with the teachings of this disclosure. The receiver array 400 of FIG. 4 includes multiple ones of the example receiver 100 of FIG. 1 arranged, positioned, and/or spaced apart from one another along an example array line 402. In the illustrated example of FIG. 4, the receiver array 400 includes a total of four receivers 100. In other examples, the receiver array 400 may include a different number of receivers 100 (e.g., two, three, eight, sixteen, etc.). In the illustrated example of FIG. 4, neighboring and/or adjacent ones of the receivers 100 of the receiver array 400 are equally spaced apart from one another by an example distance 404 defined as the distance between the reference point 112 of a first one of the receivers 100 and the reference point 112 of a second one of the receivers 100 neighboring and/or adjacent the first one of the receivers 100. In other examples, the neighboring and/or adjacent ones of the receivers 100 of the receiver array 400 may be spaced apart from one another at different (e.g., non-equal) intervals.

The array line 402 of FIG. 4 is a vector that defines the orientation of the receiver array 400. In the illustrated example of FIG. 4, the array line 402 connects and/or passes through respective ones of the reference points 112 of the receivers 100. In some such examples, each of the reference points 112 of the receivers 100 may be exactly aligned with the array line 402. In other examples, one or more of the reference points 112 of the receivers 100 may be substantially aligned with the array line 402 such that the maximum distance between any one of the reference points 112 and the array line 402 does not exceed a tolerance and/or threshold (e.g., less than ten percent of the spacing and/or distance 404 between adjacent and/or neighboring ones of the receivers 100). Wave propagation velocities associated with a formation can be calculated and/or determined with a high degree of accuracy when the array line 402 of FIG. 4 is parallel to a borehole surface of the formation from which the acoustic waves propagating through the formation are refracted toward the receivers 100 of the receiver array 400.

Figure 5:
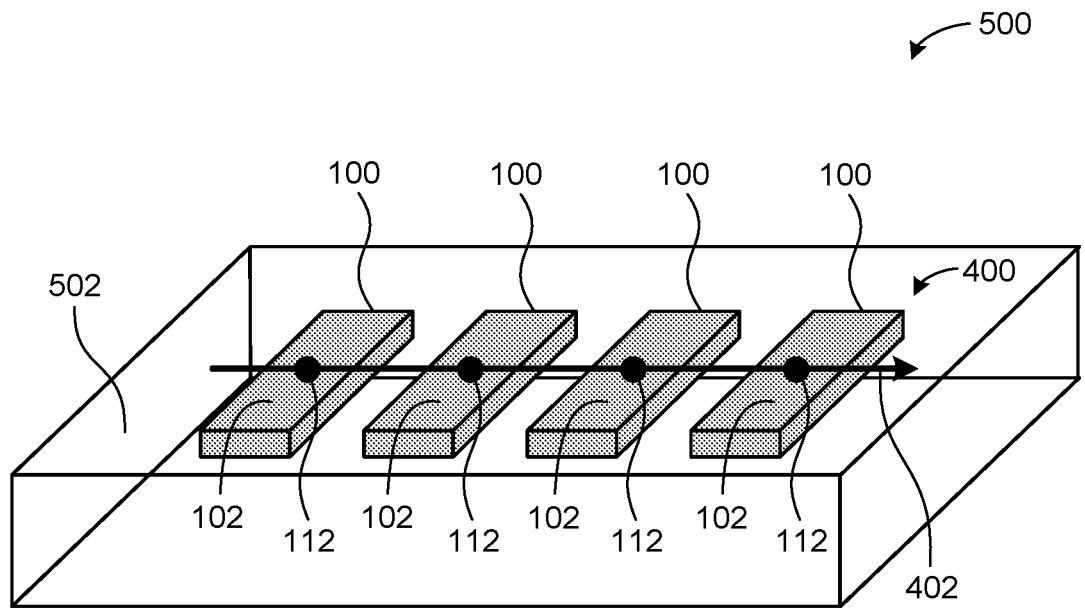
FIG. 5 is a perspective view of an example receiver assembly that may be implemented in accordance with the teachings of this disclosure.

FIG. 5 is a perspective view of an example receiver assembly 500 that may be implemented in accordance with the teachings of this disclosure. The receiver assembly 500 of FIG. 5 may be implemented as an ultrasonic transducer. The receiver assembly 500 of FIG. 5 includes an example housing 502. The receiver assembly 500 of FIG. 5 also includes the example receiver array 400 of FIG. 4 (e.g., multiple ones of the receivers 100 arranged, positioned, and/or spaced apart from one another along the array line 402 of the receiver array 400, as shown in FIG. 4). In the illustrated example of FIG. 5, the receiver array 400 is positioned, located, and/or embedded within the housing 502 such that the housing 502 contains, surrounds, and/or encapsulates the receivers 100 of the receiver array 400.

In the illustrated example of FIG. 5, the housing 502 has a rectangular prismatic shape. In other examples, the housing 502 may have a different shape, including a regular (e.g., cubic, prismatic, cylindrical, conical, spherical, pyramidal, etc.) or an irregular geometric shape. In some examples, the housing 502 of the receiver assembly 500 of FIG. 5 may be formed from a resin. In some examples, the housing 502 of the receiver assembly 500 of FIG. 5 may be formed from polyether ether ketone (PEEK).

Figure 6:
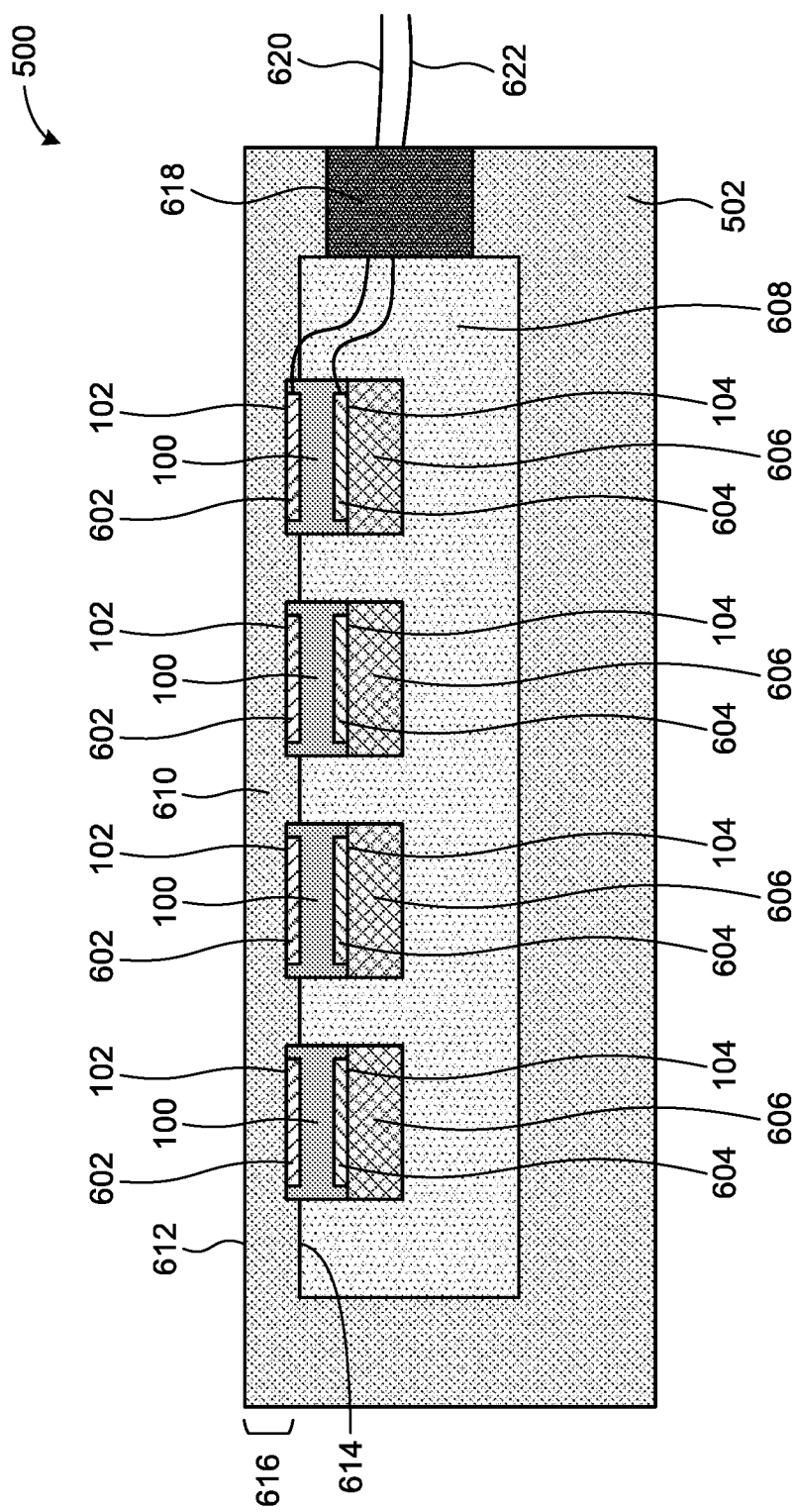
FIG. 6 is a cross-sectional view of the example receiver assembly of FIG. 5.

FIG. 6 is a cross-sectional view of the example receiver assembly 500 of FIG. 5. In the illustrated example of FIG. 6, respective ones of the receivers 100 of the receiver assembly 500 include an example first electrode 602 positioned adjacent the front surface 102 of the receiver 100 and an example second electrode 604 positioned adjacent the back surface 104 of the receiver 100. The back surface 104 of respective ones of the receivers 100 contacts, is coupled to, and/or is mounted on an example backing 606. The backings 606 operate as sound absorbers to dampen resonance and reverberation associated with the receivers 100. Each receiver 100 and its corresponding backing 606 is positioned in, coupled to, and/or mounted on an example frame 608 of the receiver assembly 500. In some examples, the frame 608 of FIG. 6 may be formed from fiber-reinforced plastic. The frame 608 of the receiver assembly 500 is positioned, located, and/or embedded within the housing 502 of the receiver assembly 500 such that the housing 502 contains, surrounds, and/or encapsulates the receivers 100, the backing 606, and the frame 608 of the receiver assembly 500.

In the illustrated example of FIG. 6, the housing 502 of the receiver assembly 500 includes an example front side portion 610 having an example outer surface 612, an example inner surface 614 located opposite the outer surface 612, and an example thickness 616 between the outer surface 612 and the inner surface 614. The frame 608 and/or the receivers 100 are positioned, located, and/or embedded within the housing 502 such that the front surfaces 102 of the respective ones of the receivers 100 contact, abut, and/or are adjacent to the inner surface 614 of the front side portion 610 of the housing 502. Placing the front surfaces 102 of respective ones of the receivers 100 in contact with the inner surface 614 of the front side portion 610 of the housing 502 provides for high quality acoustic coupling between the receivers 100 and the front side portion 610. In some examples, the thickness 616 of the front side portion 610 of the housing 502 is approximately equal to one-fourth the wavelength of a refracted formation wave that may be received at the receiver assembly 500. Structuring and/or configuring the thickness 616 of the front side portion 610 in this manner increases (e.g., maximizes) acoustic wave transmissivity from well fluid to the receivers 100 of the receiver assembly 500. In some examples, the outer surface 612 of the front side portion 610 may be positioned and/or oriented to face toward a borehole wall of a formation in connection with measuring formation velocities associated with the formation.

In the illustrated example of FIG. 6, the outer surface 612 of the front side portion 610 of the housing 502 is substantially planar and is substantially parallel to the front surfaces 102 of respective ones of the receivers 100 of the receiver assembly 500. In other examples, the outer surface 612 of the front side portion 610 of the housing 502 may have a shape and/or orientation that differs from the planar shape and the parallel orientation shown in FIG. 6. In some examples, the front side portion 610 of the housing 502 of FIG. 6 may be formed from polyether ether ketone (PEEK).

As shown in FIG. 6, the housing 502 of the receiver assembly 500 also includes an example connector 618. In the illustrated example of FIG. 6, an example first wire 620 coupled to the first electrode 602 of a first one of the receivers 100 extends from the first electrode 602, through the connector 618, and externally from the receiver assembly 500. An example second wire 622 coupled to the second electrode 604 of the first one of the receivers 100 extends from the second electrode 604, through the connector 618, and externally from the receiver assembly 500. The first wire 620 and the second wire 622 may operatively couple the first one of the receivers 100 of FIG. 6 to a controller (e.g., a processor). Other ones of the receivers 100 of the receiver assembly 500 of FIG. 6 may be similarly wired (e.g., using additional wires) and/or operatively coupled to the controller via the connector 618. In some examples, the connector 618 of FIG. 6 provides a fluid-tight seal that prevents fluid (e.g., well fluid, drilling mud, etc.) from contacting the receivers 100 of the receiver assembly 500. The receiver assembly 500 of FIGS. 5 and 6 may encounter such fluid when the receiver assembly 500 is placed into and/or implemented in a use environment (e.g., a logging while drilling environment, a wireline environment, etc.).

Figure 7:
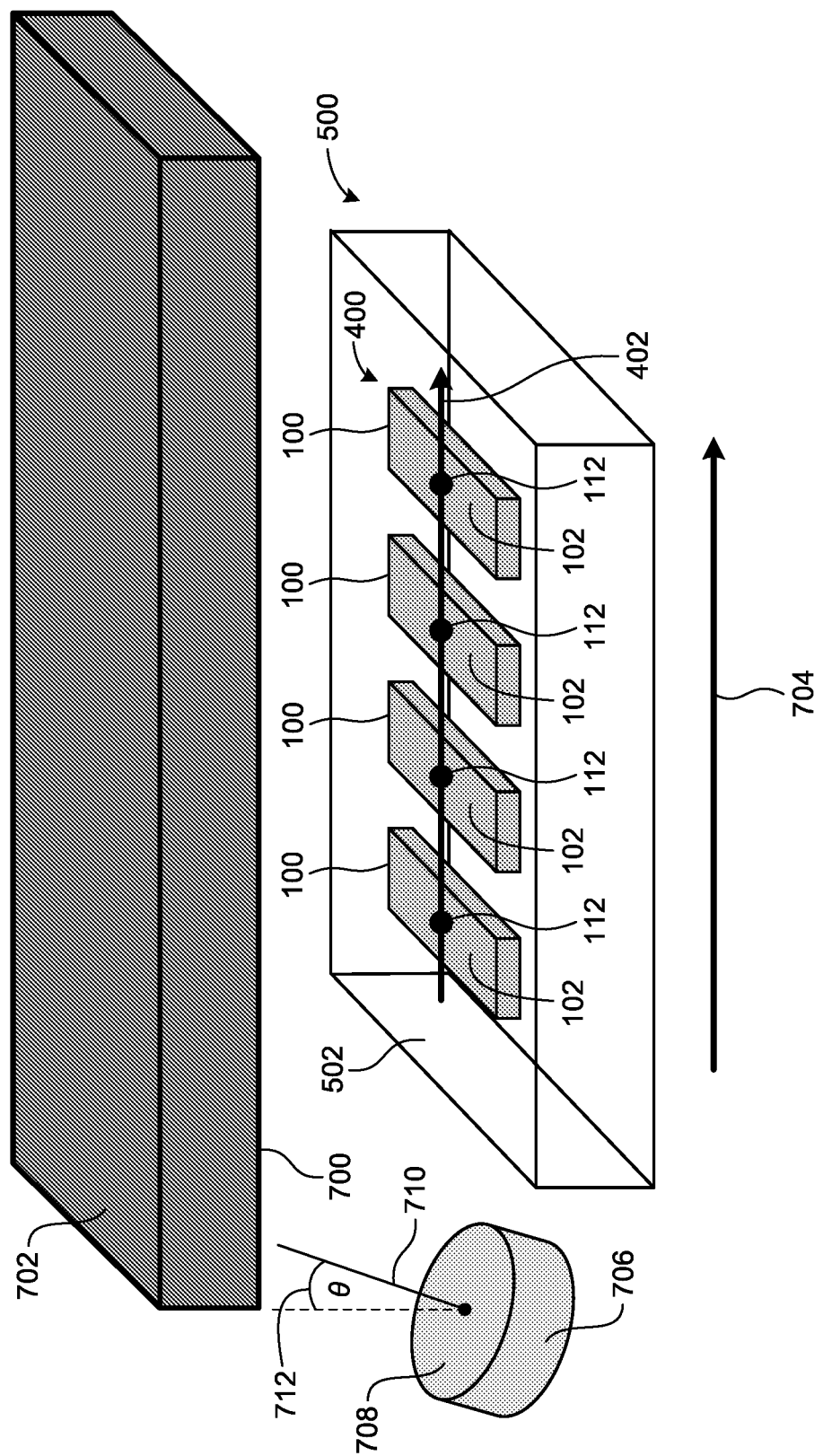
FIG. 7 is a perspective view illustrating the example receiver assembly of FIGS. 5 and 6 positioned relative to an example borehole wall of an example formation.

FIG. 7 is a perspective view illustrating the example receiver assembly 500 of FIGS. 5 and 6 positioned relative to an example borehole wall 700 of an example formation 702. In some examples, the spacing and/or void between the receiver assembly 500 and the borehole wall 700 of the formation 702 of FIG. 7 may be occupied (e.g., partially or substantially filled) by well fluid (e.g., drilling mud). The borehole wall 700 of the formation 702 of FIG. 7 has an example borehole axis 704. The example formation 702, approximated in prismatic shape in FIG. 7, is a portion of formation that forms a curved borehole in which formation waves are energetically excited by an example transmitter 706 and received by the receivers 100. In some examples, a distance from the front surfaces 102 of the receivers 100 to the borehole surface 700 is approximately the same as the example distance 204 discussed above in connection with FIG. 2, so that respective ones of the receivers 100 may receive the formation waves refracted from a relatively small portion of a borehole circumference close to the first beam width 202 along the length 106 of the receiver 100. In the illustrated example of FIG. 7, the receiver assembly 500 is positioned relative to the borehole wall 700 of the formation 702 such that the array line 402 of the receiver assembly 500 is substantially parallel to the borehole axis 704 of the borehole wall 700. When the receiver assembly 500 is positioned in this manner relative to the borehole wall 700, wave propagation velocities associated with the formation 702 can be calculated and/or determined with a high degree of accuracy.

In some examples, the receiver assembly 500 may be mounted on and/or coupled to a downhole tool. In some examples, receiver assembly 500 and/or the downhole tool may be spaced apart from the borehole wall 700 of the formation 702, as is generally shown in FIG. 7. In some examples, the downhole tool may be a logging while drilling tool and/or apparatus. In other examples, the downhole tool may be a wireline tool and/or apparatus.

As further shown in FIG. 7, an example transmitter 706 may be positioned relative to the receiver assembly 500 and/or relative to the borehole wall 700 of the formation 702. Although the transmitter 706 of FIG. 7 is shown as being separate from the receiver assembly 500, the transmitter 706 may in other examples be coupled to and/or integrated with the receiver assembly 500. The transmitter 706 of FIG. 7 includes a transmission surface 708 and a central axis 710. In the illustrated example of FIG. 7, the transmitter 706 has a cylindrical shape. In other examples, the transmitter 706 may have a different shape, including a regular (e.g., cubic, prismatic, conical, spherical, pyramidal, etc.) or an irregular geometric shape.

The transmitter 706 of FIG. 7 emits acoustic signals having one or more ultrasonic frequencies (e.g., ultrasonic acoustic signal(s)). In some such examples, the ultrasonic frequencies of the acoustic signals may be between approximately fifty kilohertz (50 kHz) and one megahertz (1 MHz). The acoustic signals are emitted in a direction away from the transmission surface 708 of the transmitter 706 along the central axis 710 of the transmitter 706 and toward the borehole wall 700 of the formation 702. The acoustic signals transmitted by the transmitter 706 excite formation waves in the formation 702. The formation waves propagate through the formation 702 adjacent the borehole wall 700 in a direction toward the receiver assembly 500. As the formation waves propagate through the formation 702, some of the formation waves refract from the formation 702 toward the receivers 100 of the receiver assembly 500.

In the illustrated example of FIG. 7, the central axis 710 of the transmitter 706, the array line 402 of the receiver assembly 500, and the borehole axis 704 of the formation 702 are substantially coplanar. The central axis 710 of the transmitter 706 is positioned at an angle (θ) 712 such that the central axis 710 is tilted toward the receiver assembly 500. In some examples, the angle (θ) 712 at which the central axis 710 of the transmitter 706 is titled may correspond to a preferred and/or critical angle (θ) that may be expressed and/or defined as follows:

$$\theta = \sin^{-1}\left(\frac{V_{mud}}{V}\right) \quad \text{Equation 1}$$

In Equation 1, V is the expected wave propagation velocity of a formation (e.g., the formation 702 of FIG. 7), $V_{mud}$ is the expected wave propagation velocity of a well fluid (e.g., the well fluid located between the receiver assembly 500 and the borehole wall 700 of the formation 702 of FIG. 7), and θ is the preferred and/or critical angle.

In some examples, the measured and/or calculated wave propagation velocity associated with a formation may be expressed and/or defined as follows:

$$V_{meas} = \frac{(Z \times |(N_{R1} N_{R2})|)}{|(T_{R1} T_{R2})|} \quad \text{Equation 2}$$

In Equation 2, ΔZ is the spacing and/or distance between neighboring and/or adjacent ones of the receivers 100 within the receiver assembly 500 (e.g., the distance 404 of FIG. 4), $N_{R1}$ is a numerical identifier (e.g., N=1, 2, 3, 4) assigned to a first one of the receivers 100 within the receiver assembly 500, $N_{R2}$ is a numerical identifier (e.g., N=1, 2, 3, 4) assigned to a second one of the receivers 100 within the receiver assembly 500, $T_{R1}$ is the time at which a formation wave is received at the first one of the receivers 100, $T_{R2}$ is the time at which a formation wave is received at the second one of the receivers 100, and $V_{meas}$ is the measured and/or calculated wave propagation velocity for the formation.

Figure 8:
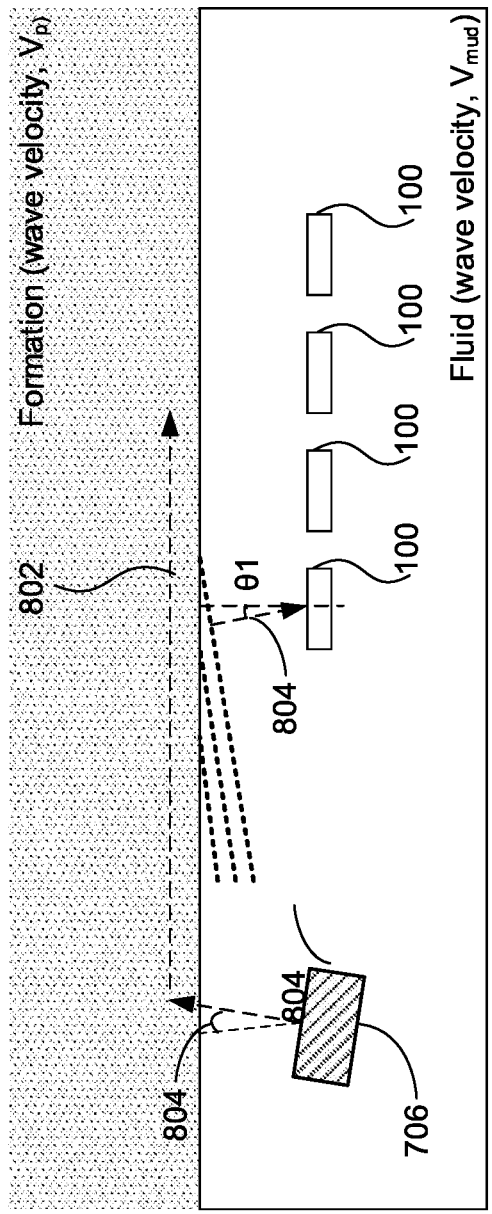
FIG. 8 is a schematic of the example transmitter of FIG. 7 exciting an example fast formation wave.
Figure 9:
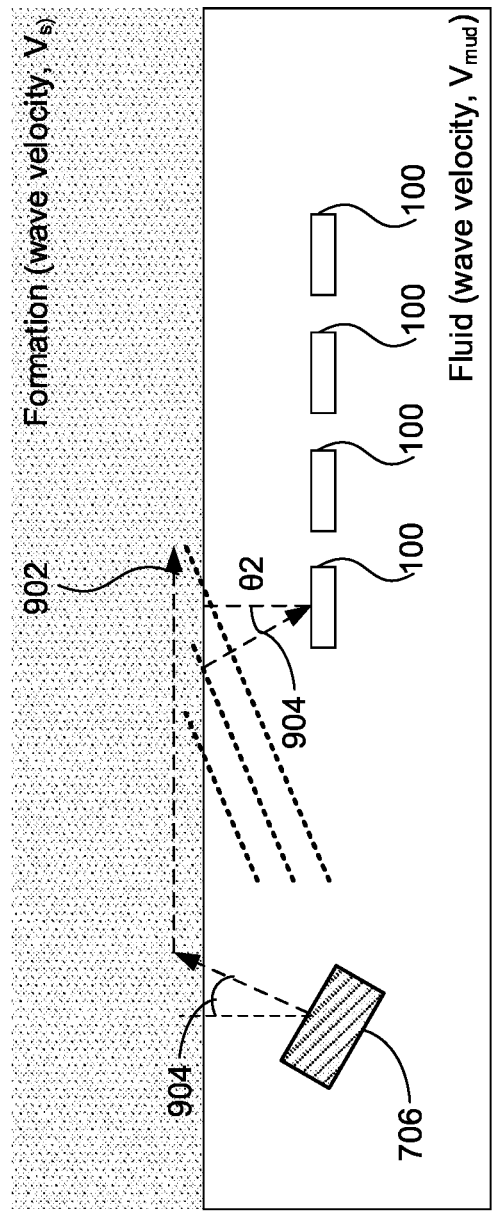
FIG. 9 is a schematic of the example transmitter of FIG. 7 exciting an example slow formation wave.

In the illustrated example of FIG. 7, as the value of the angle (θ) 712 increases, so too does the angle at which the acoustic waves propagating through the formation 702 will refract from the formation 702 toward the receivers 100 of the receiver assembly 500. For example, FIG. 8 is a schematic of the example transmitter 706 of FIG. 7 exciting an example fast formation wave 802 (e.g., P-wave) energetically by adjusting the angle (θ) 712 substantially close to the critical angle of the fast formation computed using Equation 1. FIG. 9 is a schematic of the example transmitter 706 of FIG. 7 exciting an example slow formation wave 902 (e.g., S-wave) energetically by adjusting the angle (θ) 712 substantially close to the critical angle of the slow formation computed using Equation 1. In the illustrated example of FIG. 8, the fast formation wave 802 refracts from the formation at an angle that is approximately equal to an example first angle (θ1) 804 of the transmitter 706. In the illustrated example of FIG. 9, the slow formation wave 902 refracts from the formation at an angle that is approximately equal to an example second angle (θ2) 904 of the transmitter 706. The second angle (θ2) 904 is greater than the first angle (θ1) 804. The angle at which the slow formation wave 902 refracts from the formation is accordingly greater than the angle at which the fast formation wave 802 refracts from the formation. In some examples, a distance from the front surfaces 102 of the receivers 100 to the borehole surface 700 is approximately the same as the example distance 204 discussed above in connection with FIG. 3, so that the fast and slow waves refracted into the front surfaces 102 from a portion of borehole wall 700 may locate approximately within the second beam width 302 along the width 108 of the receiver 100. The front surfaces 102 of the receivers 100 are thus substantially parallel to the borehole wall 700.

The arrangement of the transmitter 706 relative to the receivers 100 as shown in FIG. 8 may suitable for use in connection with P-wave (e.g., fast wave) formation measurements, and the arrangement of the transmitter 706 relative to the receivers 100 as shown in FIG. 9 may be suitable for use in connection with S-wave (e.g., slow wave) formation measurements. The first angle (θ1) 804 associated with the orientation of the transmitter 706 as shown in FIG. 8 may be expressed and/or defined as follows:

$$\theta1 = \sin^{-1}\left(\frac{V_{mud}}{V_p}\right) \quad \text{Equation 3}$$

In Equation 3, $V_p$ is the expected P-wave propagation velocity of a formation, $V_{mud}$ is the expected wave propagation velocity of a well fluid, and θ1 is the first angle 804. The second angle (θ2) 904 associated with the orientation of the transmitter 706 as shown in FIG. 9 may be expressed and/or defined as follows:

$$\theta2 = \sin^{-1}\left(\frac{V_{mud}}{V_s}\right) \quad \text{Equation 4}$$

In Equation 4, $V_s$ is the expected S-wave propagation velocity of the formation, $V_{mud}$ is the expected wave propagation velocity of the well fluid, and θ2 is the second angle 904.

Figure 10:
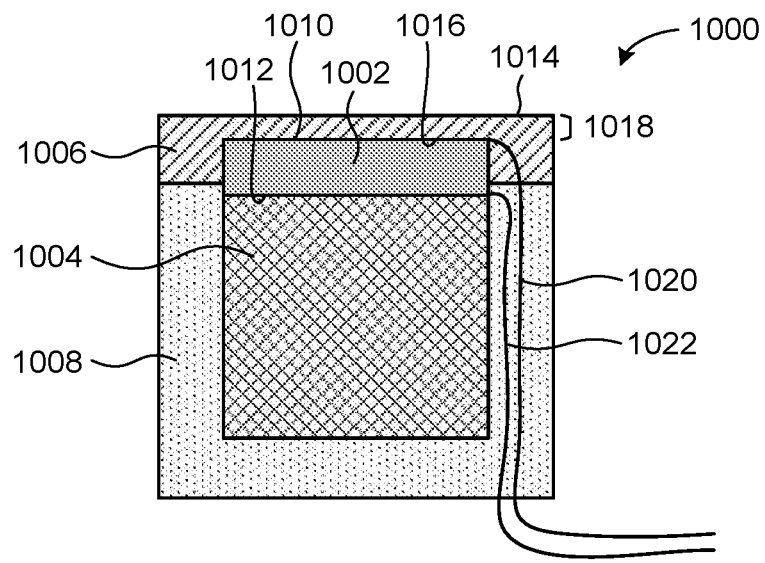
FIG. 10 is a cross-sectional view of a first example ultrasonic transducer that may be implemented in accordance with the teachings of this disclosure.

FIG. 10 is a cross-sectional view of a first example ultrasonic transducer 1000 that may be implemented in accordance with the teachings of this disclosure. The ultrasonic transducer 1000 of FIG. 10 includes an example acoustic transducer 1002, an example backing 1004, an example window 1006, and an example rubber molding 1008 that defines a housing. In some examples, the acoustic transducer 1002 is a piezoelectric member (sometimes referred to herein as a piezo element). In some examples, the acoustic transducer 1002 of FIG. 10 may be implemented via the example receiver 100 of FIGS. 1-9. In such examples, the acoustic transducer 1002 may operate and/or function as described above in connection with the example receiver 100 of FIGS. 1-9. The example acoustic transducer 1002 (e.g., a piezo element) can receive or transmit acoustic waves. The acoustic waves or signals can have frequencies that extend above or below a range of human hearing. Although for illustrative purposes the acoustic transducer 1002 will be discussed in connection with a piezo element, the acoustic transducer 1002 of the examples disclosed herein can include other materials and/or means for receiving and transmitting acoustic signals.

In the illustrated example of FIG. 10, the piezo element 1002 has an example front surface 1010 and an example back surface 1012 located opposite the front surface 1010. The backing 1004 of FIG. 10 contacts, is coupled to, and/or is mounted on the back surface 1012 of the piezo element 1002. The piezo element 1002 and the backing 1004 are positioned in and/or coupled to the rubber molding 1008 of FIG. 10. In some examples, the rubber molding 1008 of FIG. 10 is formed around a portion of the piezo element 1002 and the backing 1004 to partially contain, surround, and/or encapsulate the piezo element 1002 and the backing 1004. In some examples, the rubber molding 1008 of FIG. 10 is formed from Viton® or Aflas®.

In the illustrated example of FIG. 10, the window 1006 has an example outer surface 1014, an example inner surface 1016 located opposite the outer surface 1014, and an example thickness 1018 between the outer surface 1014 and the inner surface 1016. In some examples, the thickness 1018 of the window 1006 is approximately equal to or smaller than one-fourth the wavelength in the window 1006 material at transmitting signal frequencies between approximately fifty kilohertz (50 kHz) and one megahertz (1 MHz). The window 1006 of FIG. 10 is formed on and/or coupled to the rubber molding 1008 and the piezo element 1002 of FIG. 10 such that the inner surface 1016 of the window 1006 of contacts, abuts, and/or is adjacent to the front surface 1010 of the piezo element 1002. In some examples, the outer surface 1014 of the window 1006 may be positioned and/or oriented to face toward a borehole wall of a formation in connection with measuring formation velocities associated with the formation. In the illustrated example of FIG. 10, the outer surface 1014 of the window 1006 is substantially planar and is substantially parallel to the front surface 1010 of the piezo element 1002 of the ultrasonic transducer 1000. In other examples, the outer surface 1014 of the window 1006 may have a shape and/or orientation that differs from the planar shape and the parallel orientation shown in FIG. 10. In some examples, the window 1006 of FIG. 10 may be formed from polyether ether ketone (PEEK).

In some examples, a first electrode of the piezo element 1002 may be located adjacent the front surface 1010 of the piezo element 1002, and a second electrode of the piezo element 1002 may be located adjacent the back surface 1012 of the piezo element 1002. In the illustrated example of FIG. 10, an example first wire 1020 coupled to the first electrode of the piezo element 1002 extends from the first electrode, through the rubber molding 1008, and externally from the ultrasonic transducer 1000. An example second wire 1022 coupled to the second electrode of the piezo element 1002 extends from the second electrode, through the rubber molding 1008, and externally from the ultrasonic transducer 1000. The first wire 1020 and the second wire 1022 may operatively couple the piezo element 1002 and/or, more generally, the ultrasonic transducer 1000 of FIG. 10 to a controller (e.g., a processor).

In some examples, the window 1006 and the rubber molding 1008 of FIG. 10 collectively provide a fluid-tight seal that prevents fluid (e.g., well fluid, drilling mud, etc.) from contacting the piezo element 1002 of the ultrasonic transducer 1000. The window 1006, the rubber molding 1008, and/or, more generally, the ultrasonic transducer 1000 of FIG. 10 may encounter such fluid when the ultrasonic transducer 1000 is placed into and/or implemented in a use environment (e.g., a logging while drilling environment, a wireline environment, etc.).

Figure 11:
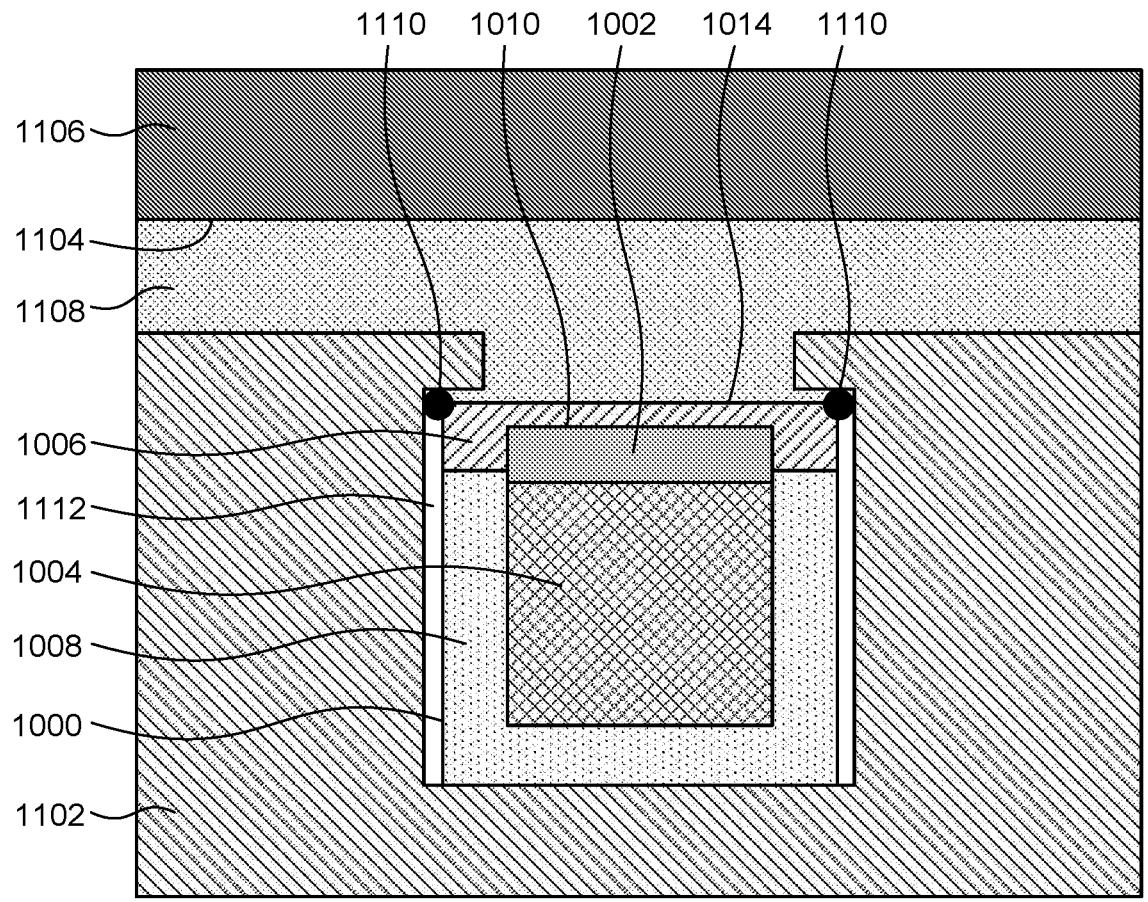
FIG. 11 is a cross-sectional view of an example logging while drilling tool including the first example ultrasonic transducer of FIG. 10.

FIG. 11 is a cross-sectional view of an example logging while drilling tool 1102 including the first example ultrasonic transducer 1000 of FIG. 10. In the illustrated example of FIG. 11, the outer surface 1014 of the window 1006 of the ultrasonic transducer 1000 is positioned and/or oriented to face toward an example borehole wall 1104 of an example formation 1106. A spacing and/or void located between the borehole wall 1104 of the formation 1106 and the outer surface 1014 of the ultrasonic transducer 1000 (and/or an outer surface of the logging while drilling tool 1102) may be occupied (e.g., partially or substantially filled) by example well fluid 1108 (e.g., drilling mud). In the illustrated example of FIG. 11, an example o-ring 1110 is positioned and/or located between a housing of the logging while drilling tool 1102 and the ultrasonic transducer 1000. The o-ring 1110 prevents well fluid (e.g., the well fluid 1108 of FIG. 11) from reaching the area of the ultrasonic transducer 1000 at which the window 1006 contacts, abuts, and/or is coupled to the rubber molding 1008 of the ultrasonic transducer 1000. In the illustrated example of FIG. 11, an example gap or space 1112 is formed between the rubber molding 1008 forming a housing of the ultrasonic transducer 1000, the o-ring 1110, and the housing of the logging while drilling tool 1102. In some examples, the gap or space 1112 may be filled with air (e.g., pressure tight) or oil for compensation approximately equal to an external pressure.

Figure 12:
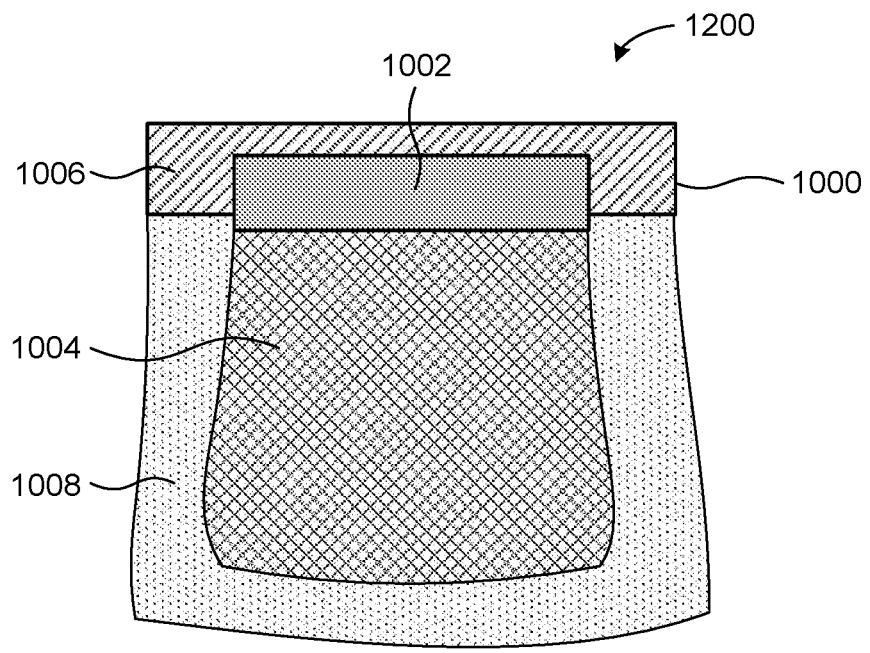
FIG. 12 is a cross-sectional view of the first example ultrasonic transducer of FIG. 10 in a first example deformed state.

FIG. 12 is a cross-sectional view of the first example ultrasonic transducer 1000 of FIG. 10 in a first example deformed state 1200. In the illustrated example of FIG. 12, the first deformed state 1200 of the ultrasonic transducer 1000 is associated with an expansion and/or enlargement of the backing 1004 of the ultrasonic transducer 1000. The rubber molding 1008 compensates for and/or enables the expansion and/or enlargement of the backing 1004.

Figure 13:
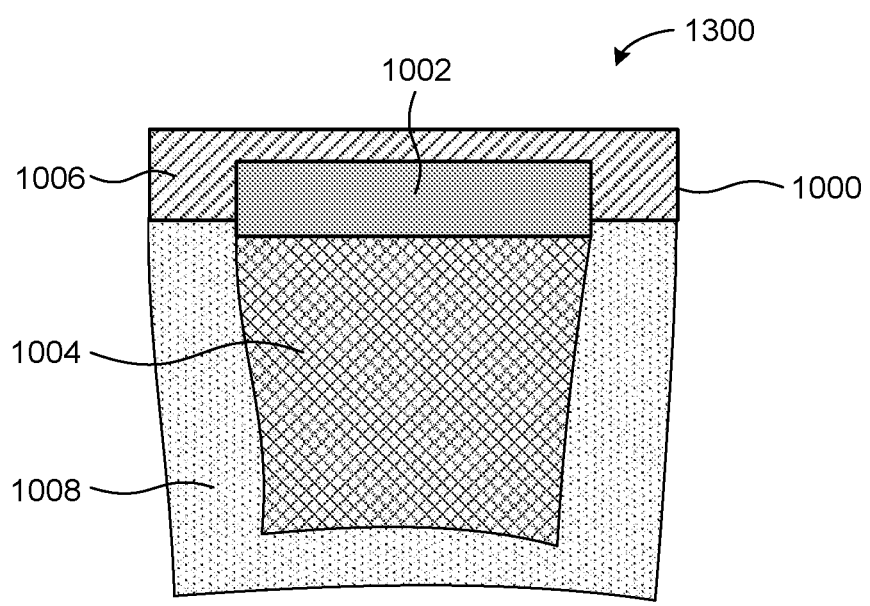
FIG. 13 is a cross-sectional view of the first example ultrasonic transducer of FIG. 10 in a second example deformed state.

FIG. 13 is a cross-sectional view of the first example ultrasonic transducer 1000 of FIG. 10 in a second example deformed state 1300. In the illustrated example of FIG. 13, the second deformed state 1300 of the ultrasonic transducer 1000 is associated with a compression and/or shrinking of the backing 1004 of the ultrasonic transducer 1000. The rubber molding 1008 compensates for and/or enables the compression and/or shrinking of the backing 1004.

Figure 14:
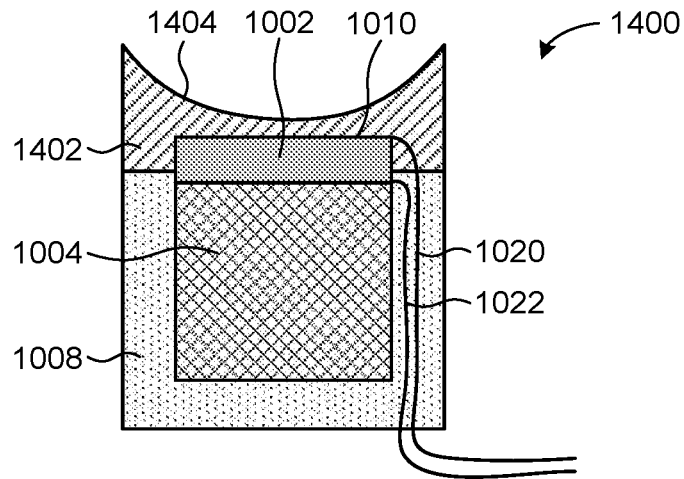
FIG. 14 is a cross-sectional view of a second example ultrasonic transducer that may be implemented in accordance with the teachings of this disclosure.

FIG. 14 is a cross-sectional view of a second example ultrasonic transducer 1400 that may be implemented in accordance with the teachings of this disclosure. The second ultrasonic transducer 1400 of FIG. 14 includes the piezo element 1002, the backing 1004, and the rubber molding 1008 of the first ultrasonic transducer 1000 of FIG. 10 described above. The second ultrasonic transducer 1400 also includes an example window 1402 that functions in a manner that is substantially the same as the window 1006 of the first ultrasonic transducer 1000 of FIG. 10 described above. Unlike the window 1006 of the first ultrasonic transducer 1000 of FIG. 10 which has a planar outer surface 1014, the window 1402 of the second ultrasonic transducer 1400 of FIG. 14 includes an example outer surface 1404 having a concave shape. The outer surface 1404 of the window 1402 of the second ultrasonic transducer 1400 of FIG. 14 is accordingly curved inwardly toward the front surface 1010 of the piezo element 1002 of second ultrasonic transducer 1400. In some examples, the window 1402 of FIG. 14 may be formed from polyether ether ketone (PEEK).

Figure 15:
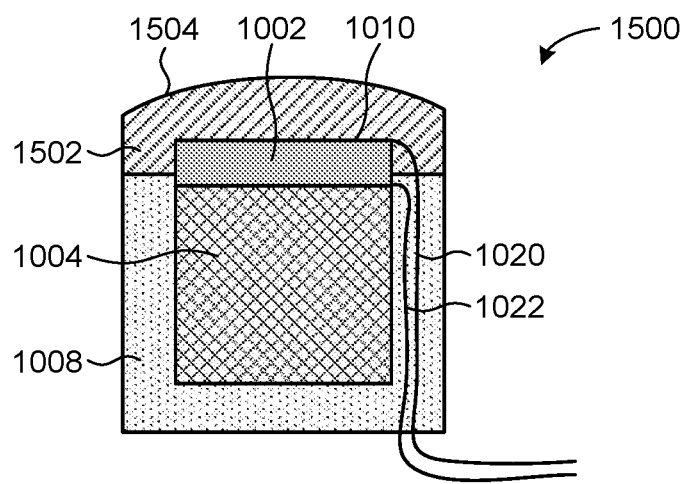
FIG. 15 is a cross-sectional view of a third example ultrasonic transducer that may be implemented in accordance with the teachings of this disclosure.

FIG. 15 is a cross-sectional view of a third example ultrasonic transducer 1500 that may be implemented in accordance with the teachings of this disclosure. The third ultrasonic transducer 1500 of FIG. 15 includes the piezo element 1002, the backing 1004, and the rubber molding 1008 of the first ultrasonic transducer 1000 of FIG. 10 described above. The third ultrasonic transducer 1500 also includes an example window 1502 that functions in a manner that is substantially the same as the window 1006 of the first ultrasonic transducer 1000 of FIG. 10 described above. Unlike the window 1006 of the first ultrasonic transducer 1000 of FIG. 10 which has a planar outer surface 1014, the window 1402 of the third ultrasonic transducer 1500 of FIG. 15 includes an example outer surface 1504 having a convex shape. The outer surface 1504 of the window 1502 of the third ultrasonic transducer 1500 of FIG. 15 is accordingly curved outwardly away from the front surface 1010 of the piezo element 1002 of third ultrasonic transducer 1500. In some examples, the window 1502 of FIG. 15 may be formed from polyether ether ketone (PEEK).

Figure 16:
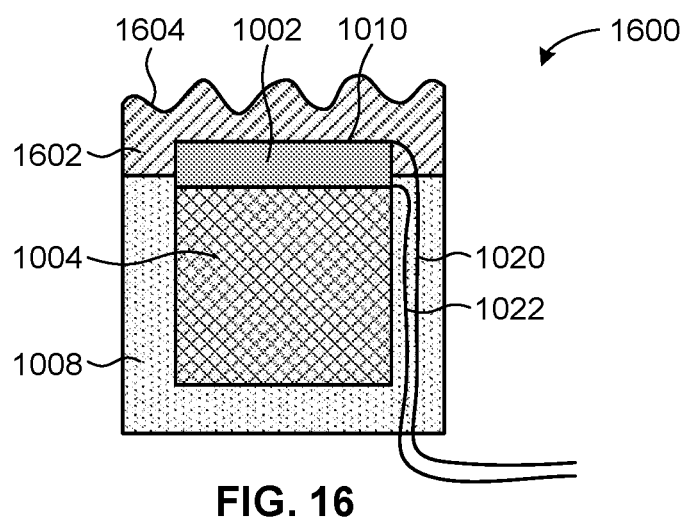
FIG. 16 is a cross-sectional view of a fourth example ultrasonic transducer that may be implemented in accordance with the teachings of this disclosure.

FIG. 16 is a cross-sectional view of a fourth example ultrasonic transducer 1600 that may be implemented in accordance with the teachings of this disclosure. The fourth ultrasonic transducer 1600 of FIG. 16 includes the piezo element 1002, the backing 1004, and the rubber molding 1008 of the first ultrasonic transducer 1000 of FIG. 10 described above. The fourth ultrasonic transducer 1600 also includes an example window 1602 that functions in a manner that is substantially the same as the window 1006 of the first ultrasonic transducer 1000 of FIG. 10 described above. Unlike the window 1006 of the first ultrasonic transducer 1000 of FIG. 10 which has a planar outer surface 1014, the window 1602 of the fourth ultrasonic transducer 1600 of FIG. 16 includes an example outer surface 1604 having a random undulating shape. The outer surface 1604 of the window 1602 of the fourth ultrasonic transducer 1600 of FIG. 16 accordingly has inwardly and outwardly curved portions relative to the front surface 1010 of the piezo element 1002 of fourth ultrasonic transducer 1600. In some examples, the window 1602 of FIG. 16 may be formed from polyether ether ketone (PEEK).

Figure 17:
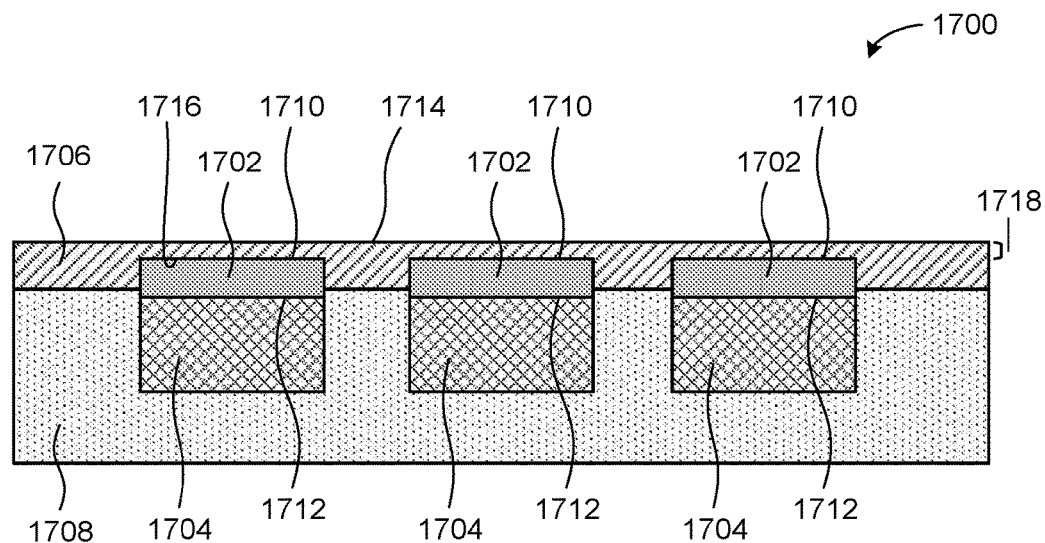
FIG. 17 is a cross-sectional view of a fifth example ultrasonic transducer that may be implemented in accordance with the teachings of this disclosure.

FIG. 17 is a cross-sectional view of a fifth example ultrasonic transducer 1700 that may be implemented in accordance with the teachings of this disclosure. The ultrasonic transducer 1700 of FIG. 17 includes acoustic transducers, which in this example can include piezo elements 1702, example backings 1704, an example window 1706, and an example rubber molding 1708. In some examples, respective ones of the piezo elements 1702 of FIG. 17 may be implemented via the example receiver 100 of FIGS. 1-9. In such examples, the piezo elements 1702 may operate and/or function as described above in connection with the example receiver 100 of FIGS. 1-9. In the illustrated example of FIG. 17, the ultrasonic transducer 1700 includes a total of three piezo elements 1702. In other examples, the ultrasonic transducer 1700 may include a different number (e.g., 2, 4, 6, 8, etc.) of piezo elements 1702.

In the illustrated example of FIG. 17, respective ones of the piezo elements 1702 have an example front surface 1710 and an example back surface 1712 located opposite the front surface 1710. Respective ones of the backings 1704 of FIG. 17 contact, are coupled to, and/or are mounted on the back surfaces 1712 of corresponding respective ones of the piezo elements 1702. The respective ones of the piezo elements 1702 and the backings 1704 are positioned in and/or coupled to the rubber molding 1708 of FIG. 17. In some examples, the rubber molding 1708 of FIG. 17 is formed around a portion of the piezo elements 1702 and the backings 1704 to partially contain, surround, and/or encapsulate the piezo elements 1702 and the backings 1704.

In the illustrated example of FIG. 17, the window 1706 has an example outer surface 1714, an example inner surface 1716 located opposite the outer surface 1714, and an example thickness 1718 between the outer surface 1714 and the inner surface 1716. In some examples, the thickness 1718 of the window 1706 is approximately equal to or smaller than one-fourth the wavelength in the window 1706 material at transmitting signal frequencies between approximately fifty kilohertz (50 kHz) and one megahertz (1 MHz). The window 1706 of FIG. 17 is formed on and/or coupled to the rubber molding 1708 and the piezo elements 1702 of FIG. 17 such that the inner surface 1716 of the window 1706 of contacts, abuts, and/or is adjacent to the front surfaces 1710 of the piezo elements 1702. In some examples, the outer surface 1714 of the window 1706 may be positioned and/or oriented to face toward a borehole wall of a formation in connection with measuring formation velocities associated with the formation. In the illustrated example of FIG. 17, the outer surface 1714 of the window 1706 is substantially planar and is substantially parallel to the front surfaces 1710 of the piezo elements 1702 of the ultrasonic transducer 1700. In other examples, the outer surface 1714 of the window 1706 may have a shape and/or orientation that differs from the planar shape and the parallel orientation shown in FIG. 17. In some examples, the window 1706 of FIG. 17 may be formed from polyether ether ketone (PEEK).

In some examples, a first electrode of a first one of the piezo elements 1702 may be located adjacent the front surface 1710 of the first one of the piezo elements 1702, and a second electrode of the first one of the piezo elements 1702 may be located adjacent the back surface 1712 of the first one of the piezo elements 1702. In some such examples, a first wire coupled to the first electrode of the first one of the piezo elements 1702 may extend from the first electrode, through the rubber molding 1708, and externally from the ultrasonic transducer 1700. A second wire coupled to the second electrode of the first one of the piezo elements 1702 may extend from the second electrode, through the rubber molding 1708, and externally from the ultrasonic transducer 1700. The first wire and the second wire may operatively couple the first one of the piezo elements 1702 and/or, more generally, the ultrasonic transducer 1700 of FIG. 17 to a controller (e.g., a processor). Other ones of the piezo elements 1702 of FIG. 17 may similarly include respective ones of the first and second electrodes and respective ones of the first and second wires to operatively couple each of the other ones of the piezo elements 1702 to the controller.

In some examples, the window 1706 and the rubber molding 1708 of FIG. 17 collectively provide a fluid-tight seal that prevents fluid (e.g., well fluid, drilling mud, etc.) from contacting the piezo elements 1702 of the ultrasonic transducer 1700. The window 1706, the rubber molding 1708, and/or, more generally, the ultrasonic transducer 1700 of FIG. 17 may encounter such fluid when the ultrasonic transducer 1700 is placed into and/or implemented in a use environment (e.g., a logging while drilling environment, a wireline environment, etc.).

Figure 18:
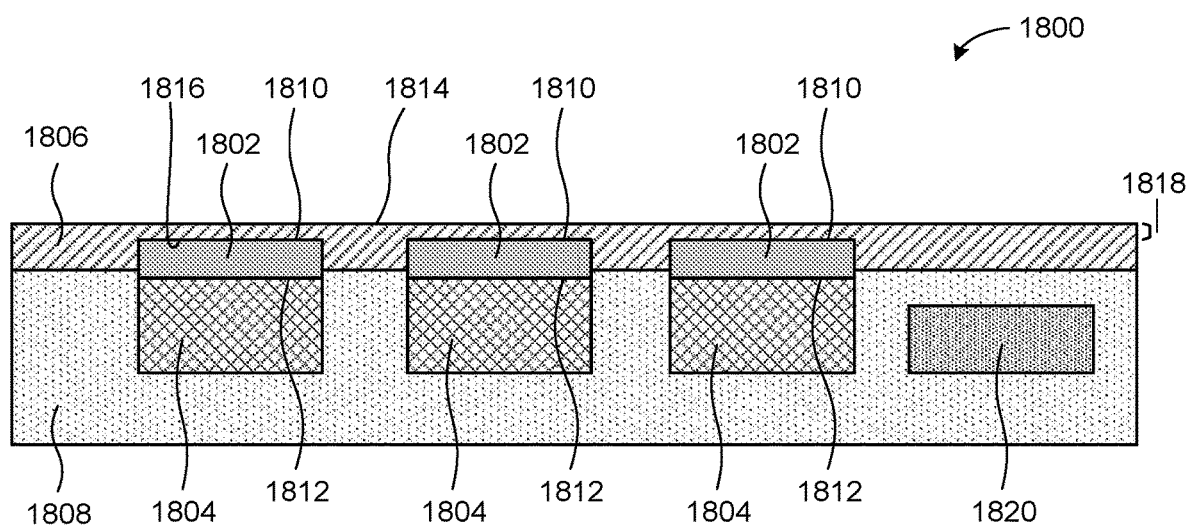
FIG. 18 is a cross-sectional view of a sixth example ultrasonic transducer that may be implemented in accordance with the teachings of this disclosure.

FIG. 18 is a cross-sectional view of a sixth example ultrasonic transducer 1800 that may be implemented in accordance with the teachings of this disclosure. The ultrasonic transducer 1800 of FIG. 18 includes acoustic transducers, which in this example can include piezo elements 1802, example backings 1804, an example window 1806, and an example rubber molding 1808. In some examples, respective ones of the piezo elements 1802 of FIG. 18 may be implemented via the example receiver 100 of FIGS. 1-9. In such examples, the piezo elements 1802 may operate and/or function as described above in connection with the example receiver 100 of FIGS. 1-9. In the illustrated example of FIG. 18, the ultrasonic transducer 1800 includes a total of three piezo elements 1802. In other examples, the ultrasonic transducer 1800 may include a different number (e.g., 2, 4, 6, 8, etc.) of piezo elements 1802.

In the illustrated example of FIG. 18, respective ones of the piezo elements 1802 have an example front surface 1810 and an example back surface 1812 located opposite the front surface 1810. Respective ones of the backings 1804 of FIG. 18 contact, are coupled to, and/or are mounted on the back surfaces 1812 of corresponding respective ones of the piezo elements 1802. The respective ones of the piezo elements 1802 and the backings 1804 are positioned in and/or coupled to the rubber molding 1808 of FIG. 18. In some examples, the rubber molding 1808 of FIG. 18 is formed around a portion of the piezo elements 1802 and the backings 1804 to partially contain, surround, and/or encapsulate the piezo elements 1802 and the backings 1804.

In the illustrated example of FIG. 18, the window 1806 has an example outer surface 1814, an example inner surface 1816 located opposite the outer surface 1814, and an example thickness 1818 between the outer surface 1814 and the inner surface 1816. In some examples, the thickness 1818 of the window 1806 is approximately equal to or smaller than one-fourth the wavelength in the window 1006 material at transmitting signal frequencies between approximately fifty kilohertz (50 kHz) and 1 megahertz (1 MHz). The window 1806 of FIG. 18 is formed on and/or coupled to the rubber molding 1808 and the piezo elements 1802 of FIG. 18 such that the inner surface 1816 of the window 1806 of contacts, abuts, and/or is adjacent to the front surfaces 1810 of the piezo elements 1802. In some examples, the outer surface 1814 of the window 1806 may be positioned and/or oriented to face toward a borehole wall of a formation in connection with measuring formation velocities associated with the formation. In the illustrated example of FIG. 18, the outer surface 1814 of the window 1806 is substantially planar and is substantially parallel to the front surfaces 1810 of the piezo elements 1802 of the ultrasonic transducer 1800. In other examples, the outer surface 1814 of the window 1806 may have a shape and/or orientation that differs from the planar shape and the parallel orientation shown in FIG. 18. In some examples, the window 1806 of FIG. 18 may be formed from polyether ether ketone (PEEK).

In some examples, a first electrode of a first one of the piezo elements 1802 may be located adjacent the front surface 1810 of the first one of the piezo elements 1802, and a second electrode of the first one of the piezo elements 1802 may be located adjacent the back surface 1812 of the first one of the piezo elements 1802. In some such examples, a first wire coupled to the first electrode of the first one of the piezo elements 1802 may extend from the first electrode, through a portion of the rubber molding 1808, and to an example electronics module 1820 embedded and/or encapsulated within the rubber molding 1808 of the ultrasonic transducer 1800. A second wire coupled to the second electrode of the first one of the piezo elements 1802 may extend from the second electrode, through a portion of the rubber molding 1808, and to the electronics module 1820. The first wire and the second wire may operatively couple the first one of the piezo elements 1802 to the electronics module 1820. In some examples, the electronics module 1820 may include a controller (e.g., a processor). In some examples, the electronics may further include a signal-conditioning circuit (e.g., an amplifier) and/or a power source (e.g., a battery). Other ones of the piezo elements 1802 of FIG. 18 may similarly include respective ones of the first and second electrodes and respective ones of the first and second wires to operatively couple each of the other ones of the piezo elements 1802 to the electronics module 1820.

In some examples, the window 1806 and the rubber molding 1808 of FIG. 18 collectively provide a fluid-tight seal that prevents fluid (e.g., well fluid, drilling mud, etc.) from contacting the piezo elements 1802 and/or the electronics module 1820 of the ultrasonic transducer 1800. The window 1806, the rubber molding 1808, and/or, more generally, the ultrasonic transducer 1800 of FIG. 18 may encounter such fluid when the ultrasonic transducer 1800 is placed into and/or implemented in a use environment (e.g., a logging while drilling environment, a wireline environment, etc.).

The example ultrasonic transducers described above may be mounted on drilling tools. For example, any of the above-described ultrasonic transducers may be mounted on drilling tools as described and illustrated in connection with FIGS. 9, 14 and 15 of U.S. Patent Application Publication No. 2017/0314385 A1, published on Nov. 2, 2017, the entirety of which is incorporated by reference herein.

Figure 19:
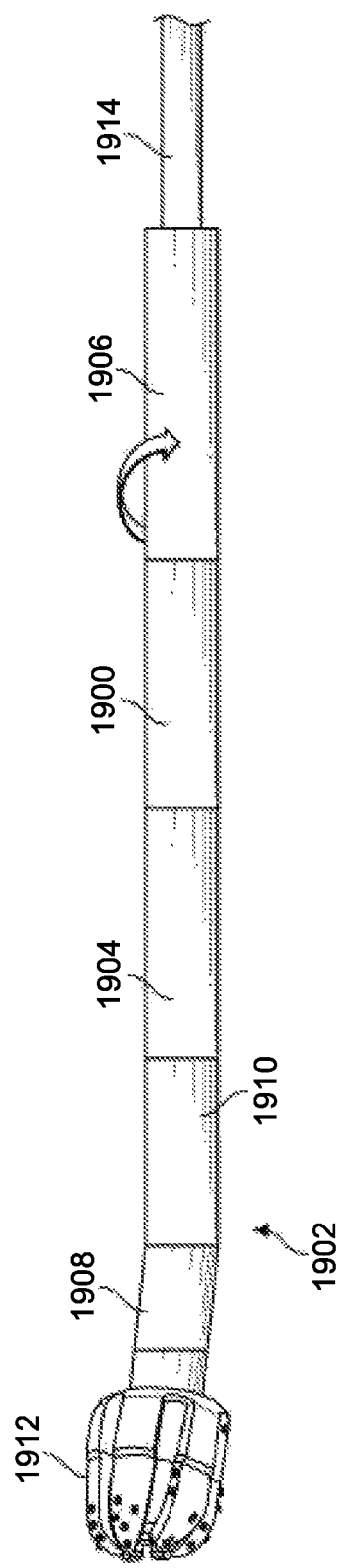
FIG. 19 is a side view of an example bottom hole assembly that may be implemented in accordance with the teachings of this disclosure.

FIG. 19 is a side view of an example bottom hole assembly (BHA) 1900 that may be implemented in accordance with the teachings of this disclosure. The BHA 1900 of FIG. 19 may be used for geo-steering coiled tubing drilling (CTD). In the illustrated example of FIG. 19, the BHA 1900 is implemented in the form of a logging while drilling (LWD) acoustic/ultrasonic BHA that enables geo-steering of a coiled tubing drilling (CTD) tool 1902. In this example, the BHA 1900 of the CTD tool 1902 is illustrated between a float sub, which may contain an example gravity and magnetic tool face measurement (MWD) system 1904, and an example orienter 1906. The orienter 1906 and the MWD system 1904 may be used in cooperation to provide steering data from an orientation survey provided by the MWD system 1904. The CTD tool 1902 may also include an example mud motor 1908 coupled between an example bent sub 1910 and an example drill bit 1912. Example coiled tubing 1914 may be used to deploy the CTD tool 1902 downhole into the borehole. In some examples, the BHA 1900 of FIG. 19 includes one or more of the example ultrasonic transducers of FIGS. 1-18 described above.

Figure 20:
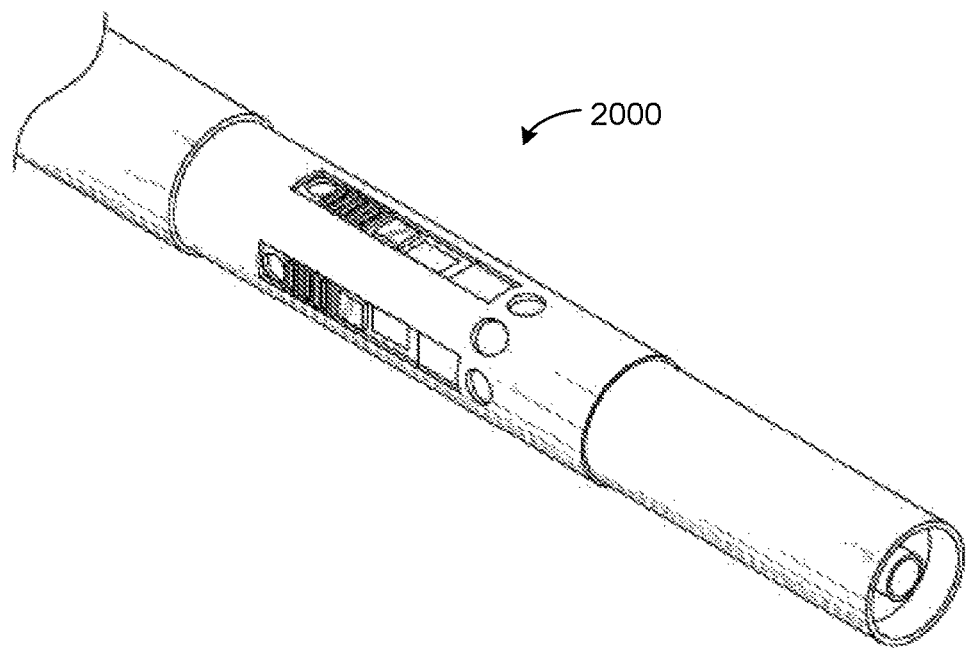
FIG. 20 is a perspective view of an example coiled tubing drilling apparatus that may be implemented in accordance with the teachings of this disclosure.

FIG. 20 is a perspective view of an example coiled tubing drilling (CTD) apparatus 2000 that may be implemented in accordance with the teachings of this disclosure. In the illustrated example of FIG. 20, the CTD apparatus 2000 is a non-rotating CTD tool. In some examples, the CTD apparatus 2000 of FIG. 20 includes one or more of the example ultrasonic transducers of FIGS. 1-18 described above.

Figure 21:
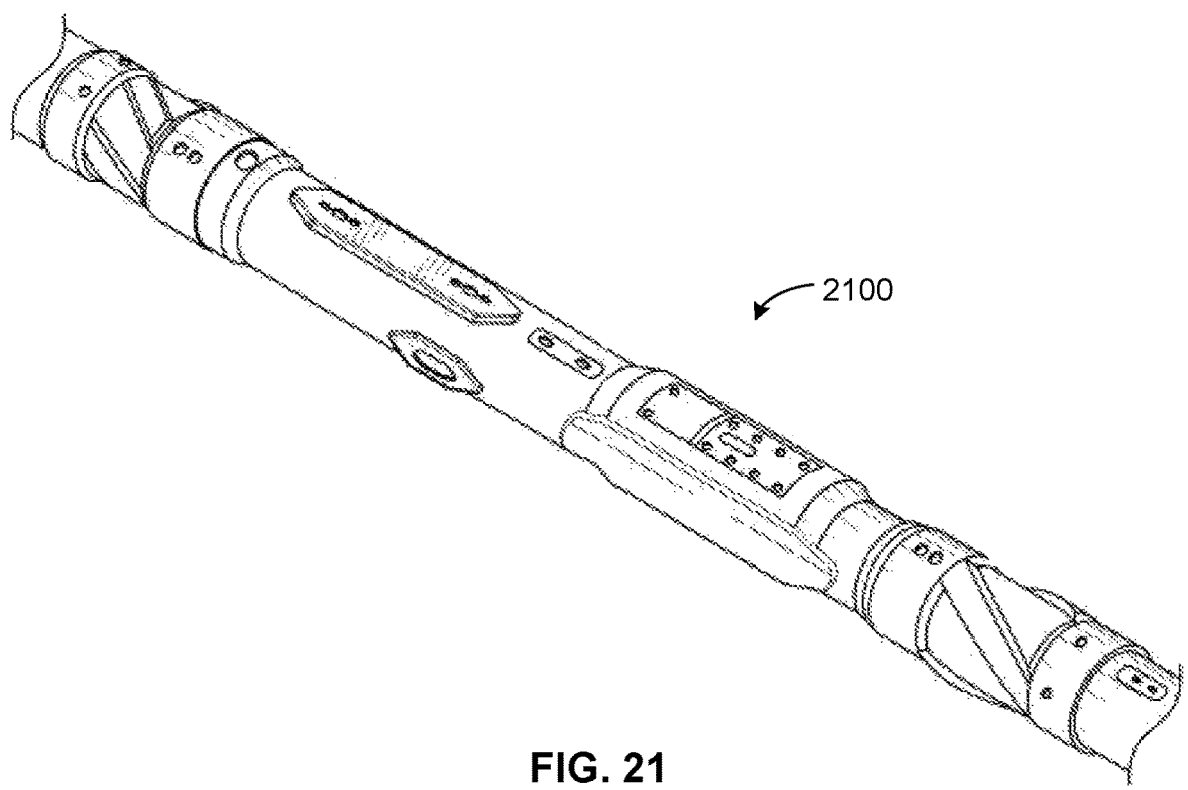
FIG. 21 is a perspective view of an example logging while drilling apparatus that may be implemented in accordance with the teachings of this disclosure.

FIG. 21 is a perspective view of an example logging while drilling (LWD) apparatus 2100 that may be implemented in accordance with the teachings of this disclosure. In the illustrated example of FIG. 21, the LWD apparatus 2100 is a rotating LWD tool. In some examples, the LWD apparatus 2100 of FIG. 21 includes one or more of the example ultrasonic transducers of FIGS. 1-18 described above.

The ultrasonic transducers, assemblies and/or devices described above may be used to enable automated and/or interactive steering inputs for steering a variety of well strings such as a well string having the example CTD tool 1902 of FIG. 19, the example CTD tool 2000 of FIG. 20, or the example LWD tool 2100 of FIG. 21. The disclosed ultrasonic transducers may be arranged in various configurations with differing numbers of ultrasonic transducers depending on the parameters of a given application. Additionally, the disclosed ultrasonic transducers may include various arrangements of transmitters and/or receivers. Data processing may be conducted downhole and/or at the surface to provide geo-steering inputs for steering of the well string according to knowledge gained regarding formation and/or drilling characteristics. The steering inputs may be used to control an orienter (e.g., the orienter 1906 of FIG. 19) or other type of tool steering assembly.

Figure 22:
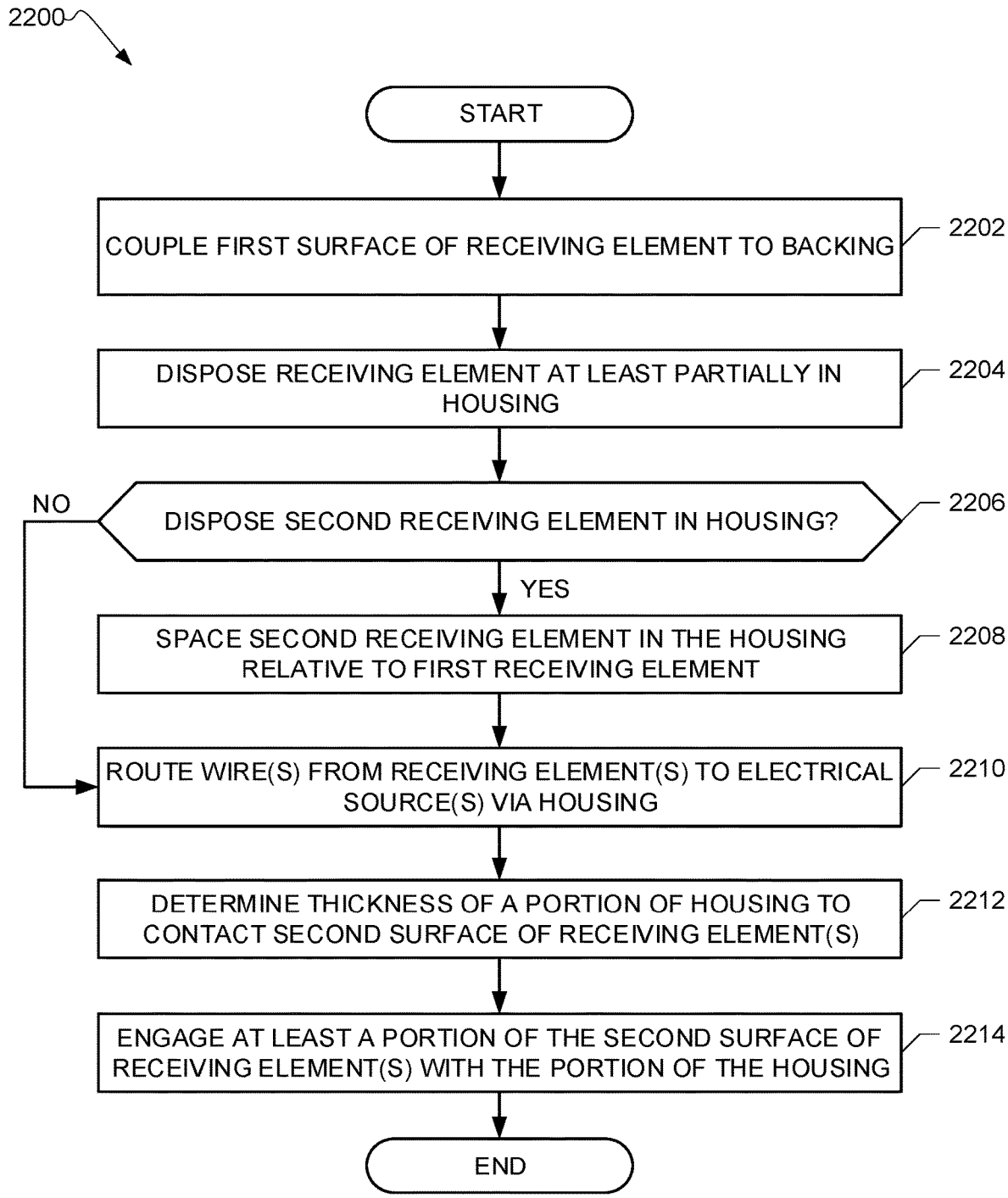
FIG. 22 is a flowchart of an example method of manufacturing the example ultrasonic transducers of FIGS. 10-18.

FIG. 22 is a flowchart of an example method 2200 for manufacturing the example transducers 1000, 1400, 1500, 1600, 1700, 1800 of FIGS. 10-18. The example method 2200 begins with coupling a first surface a receiving element to a backing (block 2202). The receiving element can include a piezo element such as the piezo element 1002 of FIG. 10. In some examples, the receiving element includes a receiver such as the example receiver 100 of FIG. 1. A back surface 1012 of the receiving element 100, 1002 can be coupled to the backing 1004 of FIG. 10, which provides means for damping resonance and reverberations associated with the acoustic receiving element.

The example method 2200 of FIG. 22 includes disposing at least a portion of the receiving element in a housing (block 2204). For example, at least a portion of the receiving element 100, 1002 can be disposed in a housing defined by the rubber molding 1008 such that the at least portion of the receiving element is encapsulated by or embedded the housing 1008.

If a second receiving element is to be disposed in the housing (block 2206), the example method 2200 of FIG. 22 includes spacing the second receiving element in the housing relative to the first receiving element (block 2208). For example, the distance between the first receiving element 100, 1002 and the second receiving element 100, 1002 can be based on the respective reference points 112 on a front surface 102, 1016 of the receiving elements 100, 1002. The reference points 112 can correspond to geometrical centers of the surfaces 102, 1002. In some examples, the reference points 112 correspond to sensitivity centers of the region of the front surface 102, 1016 that has increase sensitivity to the detection of acoustic waves. In some examples, the first and second receiving elements 100, 1002 are aligned relative to their respective reference points 112 to enable an array line 402 extending through the reference points 112 to serve as a guide for orienting the receivers such that the array line 402 is parallel to the borehole surface when the example transducers are disposed in a formation. Such an alignment can increase an accuracy of formation wave propagation velocities determined based on data collected by the receivers.

The example method 2200 of FIG. 22 continues with routing wire(s) from the receiving element(s) to electrical source(s) via the housing (block 2210). For example, the wire(s) 1020, 1022 can be routed from the receiving element(s) 100, 1002 (e.g., electrode(s) of the receiving element(s)) through the housing to operatively couple the receiving element(s) 100, 1022 to, for instance, a controller external to the housing, an electronic module 1820, etc. In some examples, the connector 618 of FIG. 6 is disposed in the housing to facilitate routing of the wires(s) 1020, 1022 and to seal the receiving elements from well fluid. In some examples, the electronics module 1820 is at least partially disposed in the housing.

The example method 2200 includes determining a thickness of a portion of the housing to contact a second surface of the receiving element(s) with the housing (block 2212). For example, the thickness of a portion of the housing such as the window 1000, 1402, 1502, 1602 can be selected based on a material of the window, expected wavelengths of signals to be detected by the receiving element 100, 1002, etc.

The example method 2200 includes engaging at least a portion of the second surface of the receiving element(s) with the portion of the housing. For example, at least a portion of the front surface 102, 1016 of the receiving elements 100, 1002 are in contact with the window 1000, 1402, 1502, 1602.

Although the example method 2200 is described with reference to the flowchart illustrated in FIG. 22, many other methods of assembling an ultrasonic transducer may alternatively be used. For example, the order of execution of the blocks may be changed, and/or some of the blocks described may be changed, eliminated, or combined.

From the foregoing, it will be appreciated that example apparatus, articles of manufacture, and methods have been disclosed herein that provide for improved accuracy in detecting acoustic waves. In examples disclosed herein, receivers are disposed in a housing made of, for instance, rubber that protects the receivers from well fluids. In an example disclosed herein, at least a portion of the receiver is in contact with the housing to provide for improved acoustic coupling between the receiver and the housing. In some examples disclosed herein, a thickness of a portion of the housing in contact with the receiver is selected to based on properties of wavelengths expected to be detected by the receiver to improve receptivity.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

An example apparatus includes a housing and an acoustic transducer having a first surface and a second surface opposite the first surface. The acoustic transducer is at least partially disposed in the housing. The example acoustic transducer includes a window supported by the housing. At least a portion of the first surface of the acoustic transducer in contact with the window. The housing and the window are to form a fluid seal for the acoustic transducer.

In some examples, the apparatus further includes a backing disposed in the housing. The second surface of the piezoelectric member coupled to the backing.

In some such examples, the housing includes a rubber material to selectively deform during expansion and contraction of the backing.

In some examples, the acoustic transducer includes a first electrode and a second electrode and the apparatus further includes a first wire coupled to the first electrode and a second wire coupled to the second electrode. Each of the first wire and the second wire are to extend through the housing to operatively couple the acoustic transducer to a controller.

In some examples, a surface of the window opposite the acoustic transducer curves away from the first surface of the acoustic transducer.

In some examples, a surface of the window opposite the acoustic transducer curves toward the first surface of the acoustic transducer.

In some examples, the acoustic transducer is a first acoustic transducer and the apparatus further includes a second acoustic transducer disposed in the housing. At least a portion of the second acoustic transducer is to contact the window.

In some such examples, the apparatus further includes a connector disposed in the housing and a wire coupled to the first acoustic transducer. The wire is to extend external to the housing via the connector. The connector is to provide a seal for the first acoustic transducer and the second acoustic transducer.

In some such examples, the first acoustic transducer is spaced a first distance from the second acoustic transducer. The first distance is defined between a first region of the first surface of the first acoustic transducer and a first region of the first surface of the second acoustic transducer. The first region of the respective first surfaces corresponds to an area of increased sensitivity relative to a remainder of the respective first surfaces In some such examples, the array includes a third acoustic transducer. The third acoustic transducer is spaced apart a second distance from the second acoustic transducer. The first distance is substantially equal to the second distance.

In some examples, the window includes polyether ether ketone (PEEK).

In some examples, the acoustic transducer includes a piezoelectric member.

Another example apparatus includes a housing, an array including a first receiver and a second receiver spaced apart from the first receiver, and a frame disposed in the housing. The frame is to support the first receiver and the second receiver. At least a portion of a first surface of the first receiver and a first surface of the second receiver are in contact with the housing.

In some examples, the housing includes polyether ether ketone (PEEK).

In some examples, the frame includes fiber-reinforced plastic.

In some examples, the apparatus further includes a backing coupled to second surface of the first receiver opposite the first surface.

An example logging-while-drilling tool to be disposed in a borehole includes a first housing and a second housing disposed in the first housing. A gap is defined between the first housing and the second housing. The example logging-while-drilling tool includes means for detecting ultrasonic acoustic waves disposed in a second housing. At least a portion of the means for detecting to engage a surface of the housing. The example logging-while-drilling tool includes means for sealing the means for detecting from fluid disposed in the gap.

In some examples, the logging-while-drilling tool further includes a transmitter. The transmitter is disposed at an angle relative to the means for detecting.

In some examples, the housing including a window, the at least a portion of the means for detecting is to engage the window.

In some examples, the logging-while-drilling tool further includes means for damping coupled to the means for detecting.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A downhole logging tool comprising:
   a tool collar having a recess in an outer surface thereof;
   a rubber housing in the recess, the rubber housing contacting an inner surface of the recess;
   a window deployed atop the rubber housing, the window and the rubber housing defining a sealed inner cavity, an inner surface of the window including a recess therein;
   a piezoelectric element deployed in the sealed inner cavity and at least partially in the recess in the inner surface of the window, at least a portion of an outer surface of the piezoelectric element contacting the window; and
   a backing layer interposed between an inner surface of the piezoelectric element and the rubber housing.

2. The tool of claim 1, wherein the rubber housing is formed around a portion of the piezoelectric element and the backing layer such that the window and the rubber housing encapsulate the piezoelectric element and the backing layer.

3. The tool of claim 1, further comprising a fluid filled gap between a sidewall of the rubber housing and a sidewall of the recess in the tool collar.

4. The tool of claim 3, further comprising a sealing member deployed about the window and disposed to seal the fluid filled gap.

5. The tool of claim 1, wherein an outer surface of the window is recessed with respect to an outer surface of the tool collar.

6. The tool of claim 1, wherein the outer and the inner surfaces of each of the piezoelectric elements include an electrode.

7. The tool of claim 1, wherein the piezoelectric element is configured as an ultrasonic transmitter.

8. The tool of claim 7, wherein a thickness of the window in a region opposing the piezoelectric element is less than one quarter of one wavelength of transmitted ultrasonic energy at a frequency between 50 kHz and 1 MHz.

9. A downhole logging tool comprising:
   a tool collar;
   an ultrasonic receiver array deployed in a recess in the tool collar;
   the ultrasonic receiver array including a plurality of piezoelectric elements at least partially deployed in a corresponding plurality of spaced apart recesses in a frame, an outer surface of each of the plurality of piezoelectric elements parallel with one another and with an axis of the tool collar; and
   a backing layer interposed between each of the plurality of piezoelectric elements and the frame; and
   a housing encapsulating the frame and the plurality of piezoelectric elements.

10. The tool of claim 9, wherein the outer surface and an inner surface of each of the piezoelectric elements include an electrode.

11. The tool of claim 10, further comprising a connector coupled with the frame, the connector configured to provide an electrical connection between each of the electrodes and a controller located in the tool collar and external to the housing.

12. The tool of claim 9, wherein a thickness of the housing in a region opposing each of the plurality of piezoelectric elements is less than one quarter of one wavelength of received ultrasonic energy at a frequency between 50 kHz and 1 MHz.

13. The tool of claim 9, wherein the outer surface of each of the plurality of piezoelectric elements contacts an inner surface of the housing.

14. The tool of claim 9, further comprising an ultrasonic transmitter deployed in the tool collar and spaced apart from the ultrasonic receiver array.

15. A downhole logging tool comprising:
   a tool collar;
   an ultrasonic transmitter deployed in a first recess in the tool collar, the ultrasonic transmitter including:
      a rubber transmitter housing in the first recess, the rubber transmitter housing contacting an inner surface of the first recess;
      a window deployed atop the rubber transmitter housing, the window and the rubber transmitter housing defining a sealed inner cavity, an inner surface of the window including a recess therein;
      a piezoelectric transmitter element deployed in the sealed inner cavity and at least partially in the recess in the inner surface of the window, an outer surface of the piezoelectric transmitter element contacting the window; and
      a transmitter backing layer interposed between the inner surface of the piezoelectric element and the rubber transmitter housing; and
   an ultrasonic receiver array deployed in a second recess in the tool collar, the first recess and the second recess axially spaced apart on the tool collar, the ultrasonic receiver array including:
      a plurality of piezoelectric receiver elements at least partially deployed in a corresponding plurality of spaced apart recesses in a frame, an outer surface of each of the plurality of piezoelectric receiver elements parallel with one another and with an axis of the tool collar;
      a receiver backing layer interposed between each of the plurality of piezoelectric receiver elements and the frame; and
      a receiver housing encapsulating the frame and the plurality of piezoelectric receiver elements.

16. The tool of claim 15, wherein an outer surface of the window is recessed with respect to an outer surface of the tool collar.

17. The tool of claim 15, further comprising:
a fluid filled gap between a sidewall of the rubber transmitter housing and a sidewall of the first recess in the tool collar; and
a sealing member deployed about the window and disposed to seal the fluid filled gap.

18. The tool of claim 15, wherein the outer surface and an inner surface of each of the piezoelectric receiver elements include an electrode and the receiver array further comprises a connector coupled with the frame, the connector configured to provide an electrical connection between each of the electrodes and a controller located in the tool collar and external to the receiver housing.

19. The tool of claim 15, wherein the outer surface of each of the plurality of piezoelectric receiver elements contacts an inner surface of the receiver housing.

20. The tool of claim 15, wherein a first thickness of the transmitter housing in a region opposing the piezoelectric transmitter element and a second thickness of the receiver housing in a region opposing each of the plurality of piezoelectric receiver elements is less than one quarter of one wavelength of received ultrasonic energy at a frequency between 50 kHz and 1 MHz.

\* \* \* \* \*